(12) United States Patent
Islam et al.

(10) Patent No.: US 11,595,826 B2
(45) Date of Patent: Feb. 28, 2023

(54) REFERENCE SIGNAL UPDATE TIMING FOR UPLINK SIGNALS

(71) Applicant: QUALCOMM Incorporated, San Diego, CA (US)

(72) Inventors: Muhammad Nazmul Islam, Littleton, MA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/948,011

(22) Filed: Aug. 27, 2020

(65) Prior Publication Data

US 2021/0144563 A1 May 13, 2021

Related U.S. Application Data

(60) Provisional application No. 63/025,325, filed on May 15, 2020, provisional application No. 62/933,203, filed on Nov. 8, 2019.

(51) Int. Cl.
*H04W 72/04* (2009.01)
*H04W 16/28* (2009.01)
(Continued)

(52) U.S. Cl.
CPC .......... *H04W 16/28* (2013.01); *H04B 7/0617* (2013.01); *H04B 17/336* (2015.01); *H04L 5/0051* (2013.01); *H04L 5/10* (2013.01); *H04L 25/0226* (2013.01); *H04W 24/10* (2013.01); *H04W 52/242* (2013.01);
(Continued)

(58) Field of Classification Search
CPC ... H04W 16/28; H04W 24/10; H04W 52/242; H04W 56/001; H04W 72/0493; H04W 76/28; H04B 7/0617; H04B 7/0695; H04B 17/336; H04B 17/318; H04L 5/0051; H04L 5/10; H04L 5/005; H04L 5/0053; H04L 5/0048; H04L 5/0007; H04L 5/0023; H04L 25/0226; H04L 27/261
See application file for complete search history.

(56) References Cited

U.S. PATENT DOCUMENTS

2018/0205469 A1    7/2018   Nagaraja et al.
2019/0075524 A1    3/2019   Zhou et al.
(Continued)

OTHER PUBLICATIONS

R4-1908825, Discussion on TCI switch requirement, MediaTek Inc., Aug. 26-30, 2019 (Year: 2019).*
(Continued)

*Primary Examiner* — Mahbubul Bar Chowdhury
(74) *Attorney, Agent, or Firm* — Harrity & Harrity, LLP

(57) ABSTRACT

Various aspects of the present disclosure generally relate to wireless communication. In some aspects, a base station may transmit a message, to a user equipment (UE), instructing the UE to activate or update a reference signal (RS) corresponding to an uplink communication transmitted by the UE. The base station may communicate with the UE, after a time period, using a beam configuration of the base station that corresponds to a beam configuration of the UE for transmitting the RS, the time period being based at least in part on a determination of whether the UE identified the beam configuration of the base station. Numerous other aspects are provided.

30 Claims, 18 Drawing Sheets

(51) Int. Cl.
  *H04B 7/06* (2006.01)
  *H04L 5/00* (2006.01)
  *H04W 52/24* (2009.01)
  *H04B 17/336* (2015.01)
  *H04L 5/10* (2006.01)
  *H04W 56/00* (2009.01)
  *H04W 24/10* (2009.01)
  *H04W 76/28* (2018.01)
  *H04L 25/02* (2006.01)

(52) U.S. Cl.
  CPC ..... *H04W 56/001* (2013.01); *H04W 72/0493* (2013.01); *H04W 76/28* (2018.02)

(56) References Cited

U.S. PATENT DOCUMENTS

| | | | |
|---|---|---|---|
| 2019/0222289 A1 | 7/2019 | John Wilson et al. | |
| 2020/0177250 A1* | 6/2020 | Chang | H04B 7/0617 |
| 2020/0229161 A1* | 7/2020 | Raghavan | H04L 5/0091 |
| 2020/0351842 A1* | 11/2020 | Lin | H04W 24/10 |
| 2021/0068123 A1* | 3/2021 | Zhu | H04B 7/0814 |

OTHER PUBLICATIONS

R1-1717605, On Beam Management, Measurement and Reporting, Samsung, Oct. 9-13, 2017 (Year: 2017).*
R1-1720290, On Beam Management, Measurement and Reporting, Samsung, Nov. 27-Dec. 1, 2017 (Year: 2017).*
R4-1907212, Draft CR to 38.133 on TCI State Switching Requirements (Section 8.10), Intel Corporation, May 13-17, 2019 (Year: 2019).*
R4-1907901, 3GPP TSG RAN WG4#91 Approval, May 13-17, 2019 (Year: 2019).*
R4-1907212, Intel Corporation, Draft CR to 38.133 on TCI State Switching Requirements, 3GPP TSG-RAN WG4 Meeting #91, May 13-17, 2019 (Year: 2019).*
R4-1908702, Mediatek Inc., draftCR on TS38.133 for TCI state switching, 3GPP TSG-RAN WG4 Meeting #92, Aug. 26-30, 2019 (Year: 2019).*
International Search Report and Written Opinion—PCT/US2020/070475—ISA/EPO—dated Nov. 12, 2020.
Samsung: "On Beam Indication", 3GPP Draft, 3GPP TSG RAN WG1 Meeting 90bis, R1-1717627 On Beam Indication_V1, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017 , Oct. 2, 2017 (Oct. 2, 2017), XP051352484, 9 Pages, Retrieved from the Internet: URL:http://www.3gpp.org/ftp/tsg_ran/WG1_RL1/TSGR1_90b/Docs/ [retrieved on Oct. 2, 2017], sections 2.1-2.3.
3GPP TSG-RAN WG1: "LS on Applicable Timing for Pathloss RS Activated/Updated by MAC-CE", 3GPP TSG-RAN WG1 Meeting #98bis, R1-1911616, Chongqing, China, 2 Pages, Oct. 14-20, 2019.
Nokia, et al., CR TCI State Switching Requirements (Section 8.10), 3GPP TSG-RAN WG4 Meeting #92, R4-1908668, Ljubljana, Slovenia, 3 Pages, Aug. 26-30, 2019.

* cited by examiner

REFERENCE SIGNAL UPDATE TIMING FOR UPLINK SIGNALS

CROSS-REFERENCE TO RELATED APPLICATION

This patent application claims priority to U.S. Provisional Patent Application No. 62/933,203, filed on Nov. 8, 2019, entitled "REFERENCE SIGNAL UPDATE TIMING FOR UPLINK SIGNALS," and U.S. Provisional Patent Application No. 63/025,325, filed May 15, 2020, entitled "REFERENCE SIGNAL UPDATE TIMING FOR UPLINK SIGNALS," both assigned to the assignee hereof. The disclosures of the prior applications are considered part of and are incorporated by reference in this patent application.

FIELD OF THE DISCLOSURE

Aspects of the present disclosure generally relate to wireless communication and to techniques and apparatuses for reference signal updating timing for uplink signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include transmitting a message, to a user equipment (UE), instructing the UE to activate or update a reference signal (RS) corresponding to an uplink communication transmitted by the UE. The method may include communicating with the UE, after a time period, using a beam configuration of the base station that corresponds to a beam configuration of the UE for transmitting the RS, the time period being based at least in part on a determination of whether the UE identified the beam configuration of the base station.

In some aspects, a method of wireless communication, performed by a UE, may include receiving a message, from a base station, instructing the UE to activate or update an RS corresponding to an uplink communication transmitted by the UE. The method may include communicating with the base station, after a time period, using a beam configuration of the UE for transmitting the RS that corresponds to a beam configuration of the base station, the time period being based at least in part on a determination of whether the UE identified the beam configuration of the base station.

In some aspects, a base station for wireless communication may include memory and one or more processors operatively coupled to the memory. The memory and the one or more processors may be configured to transmit a message, to a UE, instructing the UE to activate or update an RS corresponding to an uplink communication transmitted by the UE. The memory and the one or more processors may be configured to communicate with the UE, after a time period, using a beam configuration of the base station that corresponds to a beam configuration of the UE for transmitting the RS, the time period being based at least in part on a determination of whether the UE identified the beam configuration of the base station.

In some aspects, a UE for wireless communication may include memory and one or more processors operatively coupled to the memory. The memory and the one or more processors may be configured to receive a message, from a base station, instructing the UE to activate or update an RS corresponding to an uplink communication transmitted by the UE. The memory and the one or more processors may be configured to communicate with the base station, after a time period, using a beam configuration of the UE for transmitting the RS that corresponds to a beam configuration of the base station, the time period being based at least in part on a determination of whether the UE identified the beam configuration of the base station.

In some aspects, a non-transitory computer-readable medium may store one or more instructions for wireless communication. The one or more instructions, when executed by one or more processors of a UE, may cause the one or more processors to transmit a message, to a UE, instructing the UE to activate or update an RS corresponding to an uplink communication transmitted by the UE, and communicate with the UE, after a time period, using a beam configuration of the base station that corresponds to a beam configuration of the UE for transmitting the RS, the time period being based at least in part on a determination of whether the UE identified the beam configuration of the base station.

In some aspects, a non-transitory computer-readable medium may store one or more instructions for wireless communication. The one or more instructions, when executed by one or more processors of a UE, may cause the one or more processors to receive a message, from a base station, instructing the UE to activate or update an RS corresponding to an uplink communication transmitted by the UE, and communicate with the base station, after a time period, using a beam configuration of the UE for transmitting the RS that corresponds to a beam configuration of the base station, the time period being based at least in part on a determination of whether the UE identified the beam configuration of the base station.

In some aspects, an apparatus for wireless communication may include means for transmitting a message, to a UE, instructing the UE to activate or update an RS corresponding to an uplink communication transmitted by the UE, and means for communicating with the UE, after a time period, using a beam configuration of the apparatus that corresponds to a beam configuration of the UE for transmitting the RS, the time period being based at least in part on a determination of whether the UE identified the beam configuration of the apparatus.

In some aspects, an apparatus for wireless communication may include means for receiving a message, from a base station, instructing the apparatus to activate or update an RS corresponding to an uplink communication transmitted by the apparatus, and means for communicating with the base station, after a time period, using a beam configuration of the apparatus for transmitting the RS that corresponds to a beam configuration of the base station, the time period being based at least in part on a determination of whether the apparatus identified the beam configuration of the base station.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
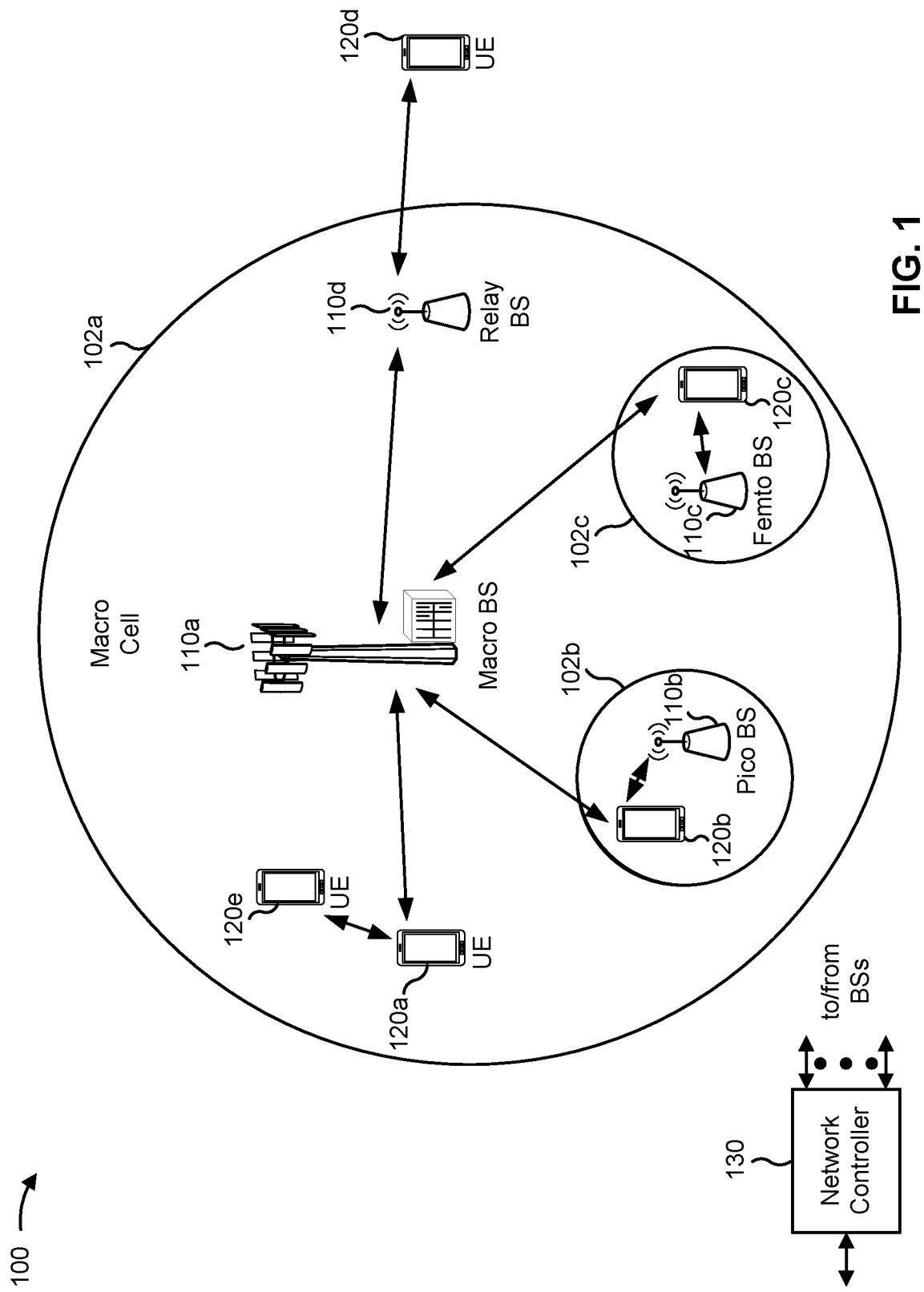
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
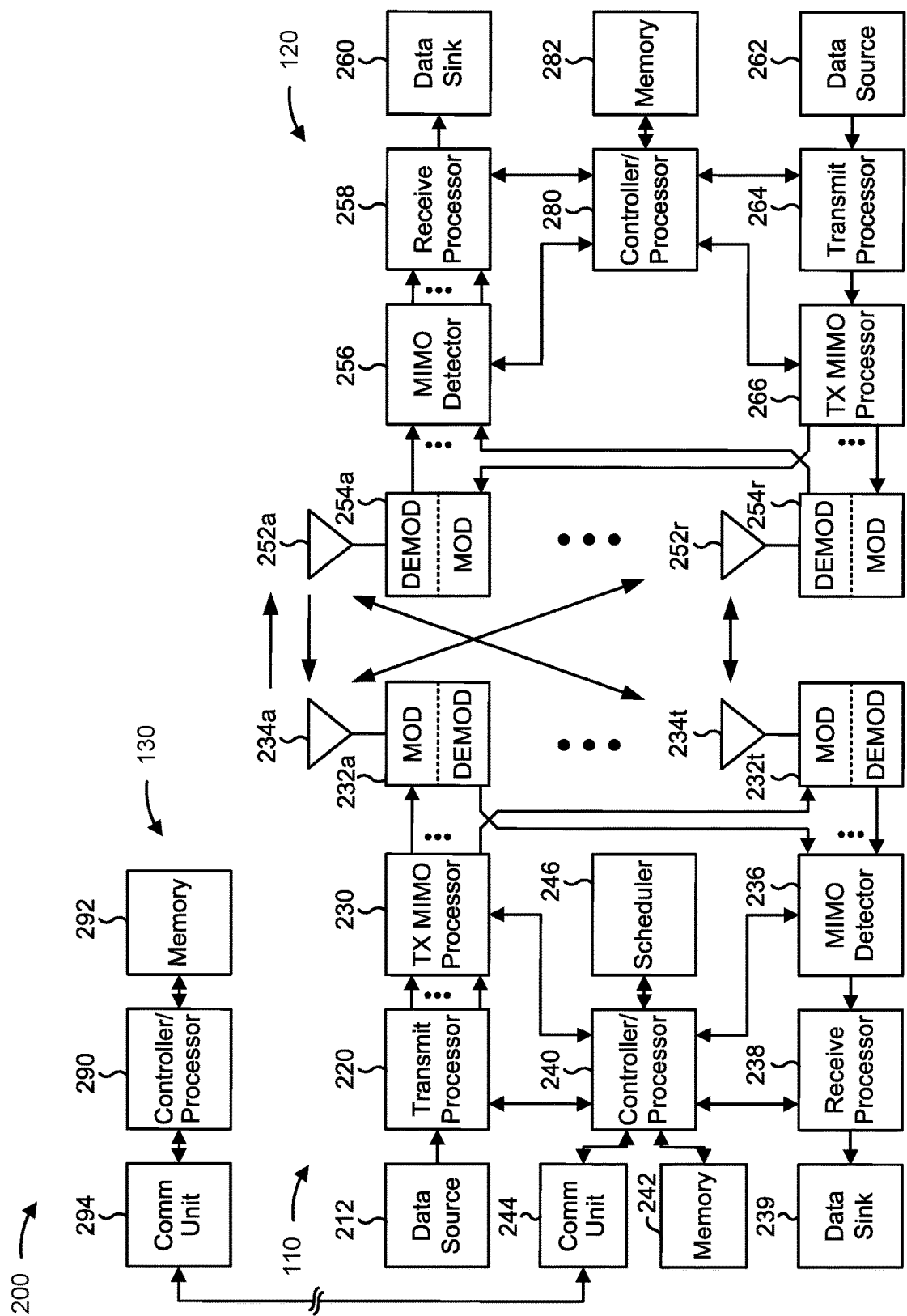
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reference signal (RS) update timing for uplink signals, as described in more detail elsewhere herein. For example, controller/processor 240 of base station 110, controller/processor 280 of UE 120, and/or any other component(s) of FIG. 2 may perform or direct operations of, for example, process 1300 of FIG. 13 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1200 of FIG. 12, and/or other processes as described herein. A scheduler 246 may schedule UEs for data transmission on the downlink and/or uplink.

In some aspects, UE 120 may include means for receiving a message, from a base station, instructing the UE to activate or update an RS corresponding to an uplink communication transmitted by the UE, and means for communicating with the base station, after a time period, using a beam configuration of the UE for transmitting the RS that corresponds to a beam configuration of the base station, the time period being based at least in part on a determination of whether the UE identified the beam configuration of the base station, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a message, to a UE, instructing the UE to activate or update an RS corresponding to an uplink communication transmitted by the UE, and means for communicating with the UE, after a time period, using a beam configuration of the base station that corresponds to a beam configuration of the UE for transmitting the RS, the time period being based at least in part on a determination of whether the UE identified the beam configuration of the base station, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
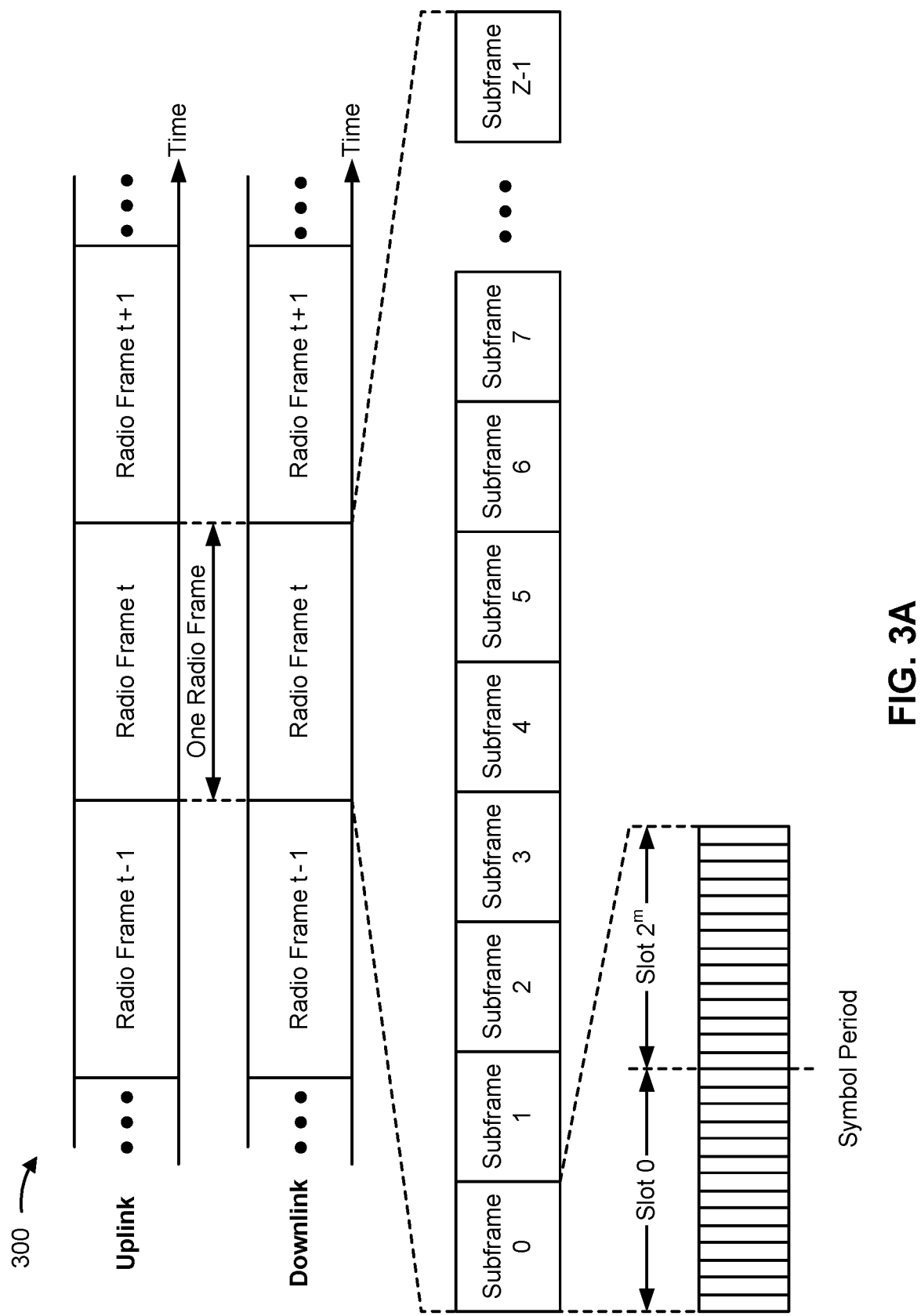
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
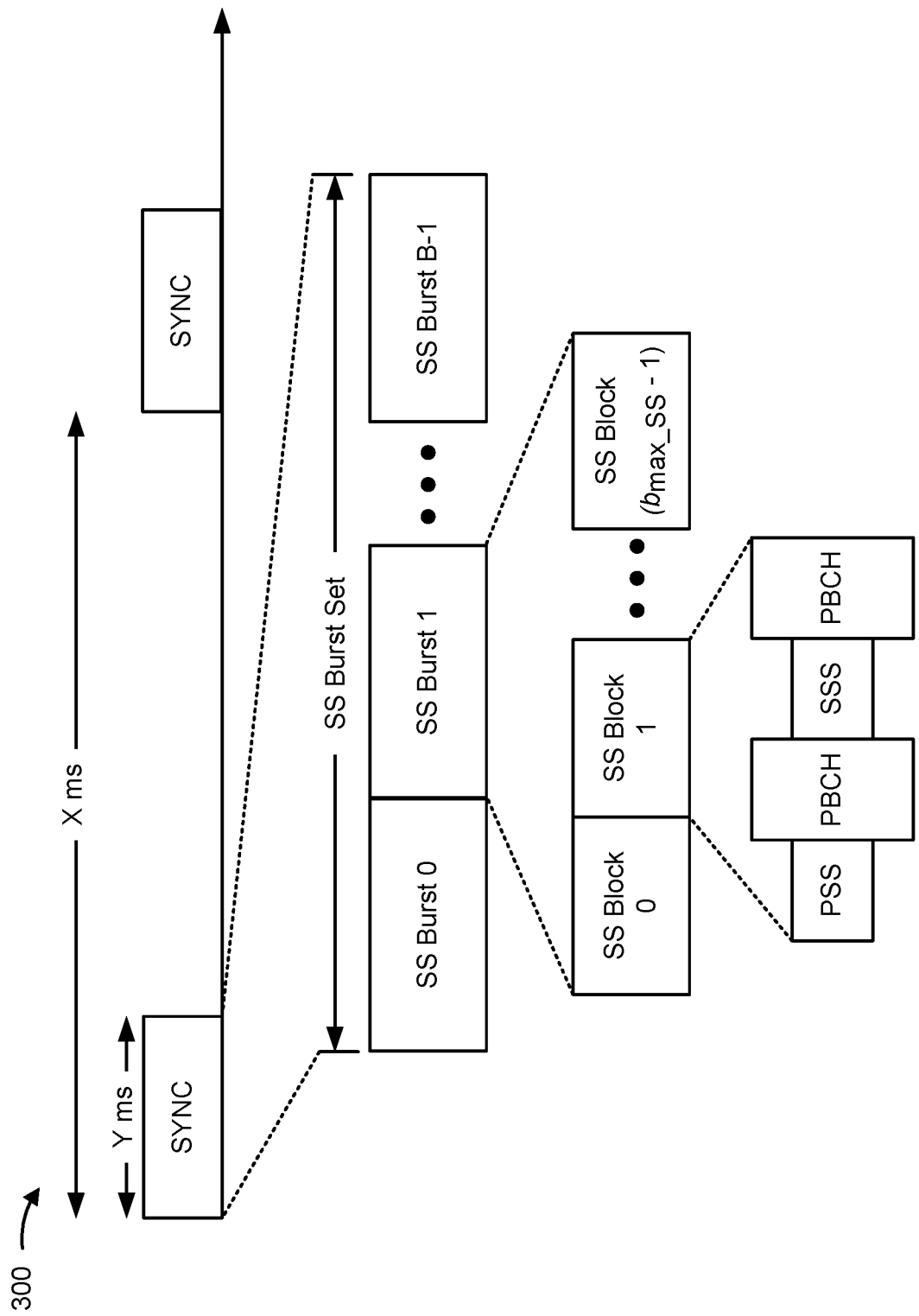
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
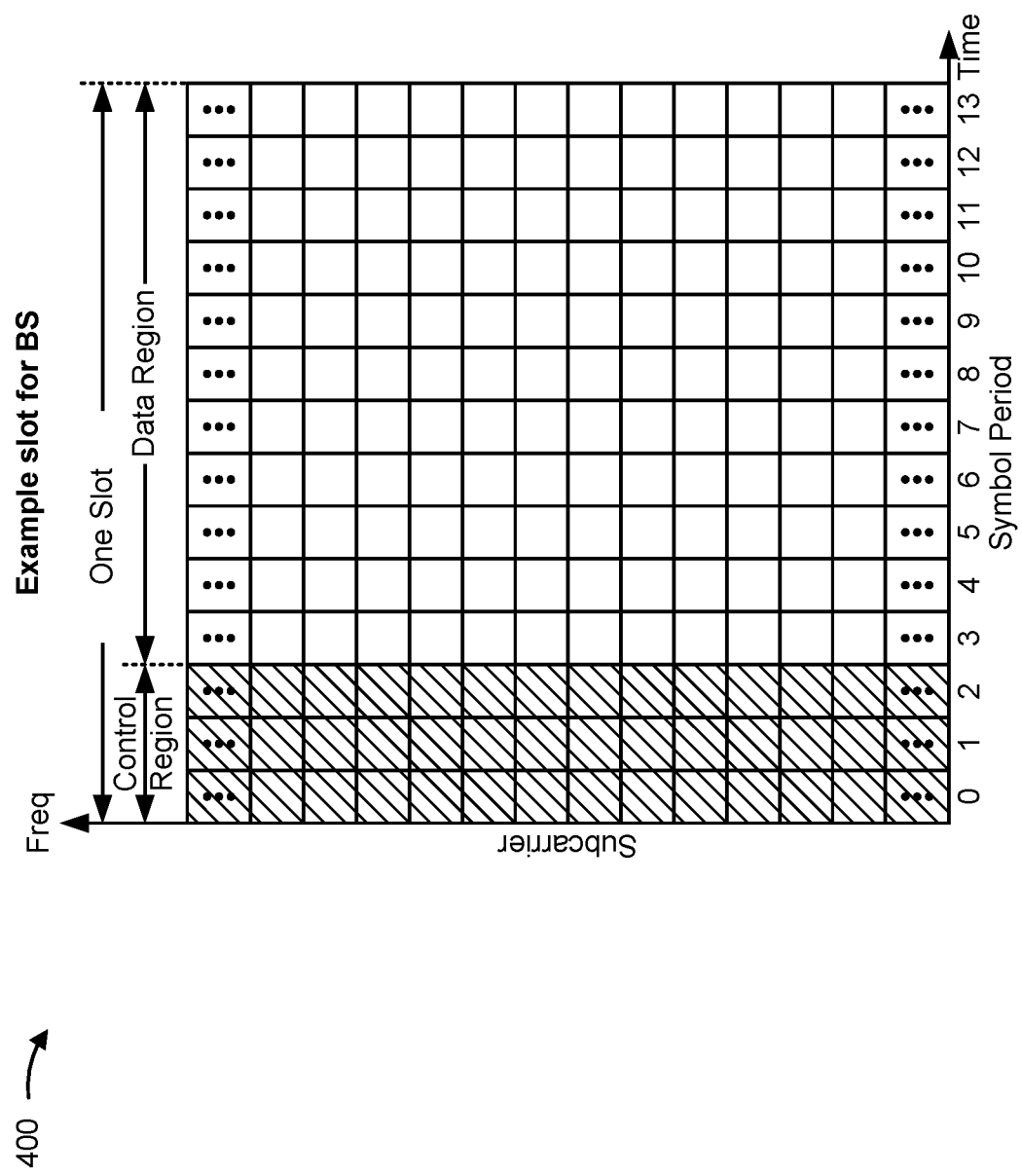
FIG. 4 is a block diagram conceptually illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
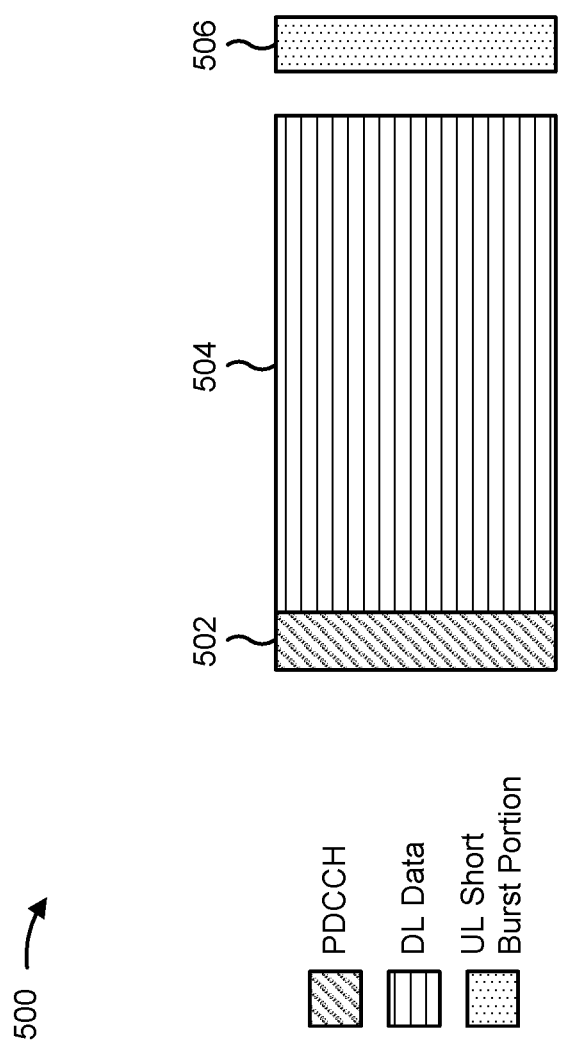
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information, a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
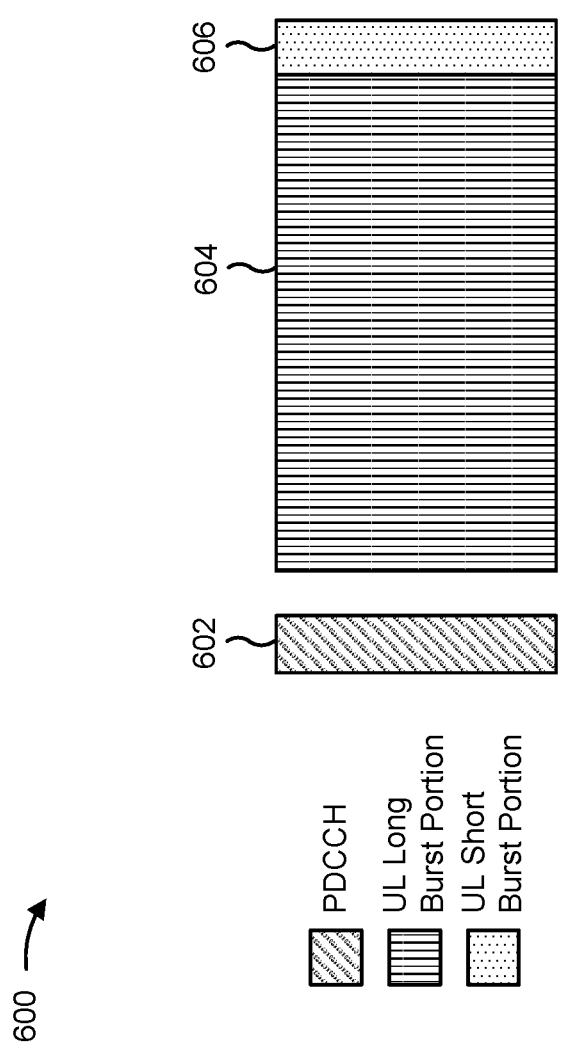
FIG. 6 is a diagram illustrating an example of an uplink (UL)-centric slot, in accordance with various aspects of the present disclosure.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). Alternatively, the UL portion may include the resources. In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 706 described above with reference to FIG. 5, and may include any of the information described above in connection with FIG. 5. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, "sidelink signal" may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided as an example. Other examples may differ from what is described with regard to FIG. 6.

In NR, a BS (e.g., gNB) may transmit signals in different directions using transmitting beams and receive signals from different directions using receiving beams. A beam may be specified by a beam configuration. For a downlink communication, the beam configuration may be one or more transmission control indication (TCI) states. A TCI state may specify one or more antenna ports and/or a direction for an active beam for transmitting the downlink communication towards a UE. There may be one or more TCI states for each bandwidth part of one or more common carriers that the BS uses for transmission.

A UE may also transmit signals in different directions using transmitting beams and receive signals from different directions using receiving beams. The UE may also identify the transmitting beam of the BS. Sometimes, the UE may perform a beam sweep to identify the transmitting beam of the BS. A UE may perform the beam sweep by transmitting beams in all predefined directions in a burst in a regular interval. The UE may then perform one or more measurements on one or more samples of beams to identify a beam to use. A beam configuration for uplink communications may be referred to as an uplink spatial filter.

The UE may use a reference signal (RS) to identify characteristics of downlink communications in order to improve a receiving beam setting of the UE. The BS may transmit a message to activate or update the RS that corresponds to downlink communications. After a time period, the base station may expect that the UE has been able to update or activate the RS and the base station may proceed with communicating with the UE through an activated or updated receiving beam configuration. The time period from transmission of an RS activation message to communication between the BS and the UE may be referred to as an activation timeline.

An activation timeline for an RS corresponding to downlink channels depends on whether a beam configuration (e.g., target TCI state) of the BS is known or unknown to the UE. The BS may determine that a UE has already identified and stored (e.g., in an active TCI list) the beam configuration of the BS based on a number of conditions, such as by receiving a measurement report or detecting that a signal-to-noise ratio (SNR) for a TCI state is greater than or equal to a certain threshold. It may be said that the UE knows the TCI state of the BS. For example, if a TCI state is known (in an active TCI state list), the UE may receive a medium access control control element (MAC CE) to activate a reference signal corresponding to a downlink channel at slot n and receive a PDCCH message a period of time after slot n, where the period of time includes a time from downlink data transmission to acknowledgement ($T_{HARQ}$) plus 3 ms. The time period may be as long as 5 measurement samples or less.

If a target TCI state is not in the active TCI state list for PDSCH (not known to the UE), time is added to the activation timeline that is equal to a time to a first synchronization signal block (SSB) transmission ($T_{first-SSB}$) after the MAC CE command is decoded ($T_{SSB-proc}$). Also, measurement time for beam refinement ($T_{L1-RSRP}$) is added.

While BSs may extend an activation timeline for RSs that correspond to downlink signals, there is presently no activation timeline that may be extended for RSs that correspond to uplink signals. Without an activation timeline that varies based on whether the UE knows the TCI state of the BS, the BS may prematurely proceed with communicating with the UE. The UE may not have had time to utilize an RS for uplink signals and set a proper uplink spatial relation of the UE. This may result in transmissions from the UE that are poor in quality or that require retransmissions. The BS and UE may waste power, processing, and signaling resources that may be involved with poorer quality transmissions or a transmission power that is not sufficient for a particular beam arrangement.

In some aspects, the BS may instruct the UE to activate or update an RS corresponding to uplink signals (e.g., path loss RS for communication on a physical uplink channel). The BS may wait an appropriate time period based on a determination of whether the beam configuration (or activated signal) of the BS is known or unknown to the UE. The BS may, after the appropriate time period, proceed with communicating with the UE. In some aspects, the BS may wait an appropriate time period in response to activation of another RS that is quasi co-located with the RS. The UE may use such a resource to find a parameter of the RS (e.g., direction, spread, Doppler shift, and/or the like).

In some aspects, the UE may use the RS for uplink signals to identify a proper uplink transmission power for communicating with the BS. For example, the UE may activate a particular uplink spatial relation that was refined by information from an uplink pathloss RS or an aperiodic sounding RS. The UE may transmit multiple uplink communications with refined beams, with the UE centered on an initial beam that the UE identified to communicate with the BS. In this way, the BS and UE may communicate with beam configurations that benefit from accurate RS information for uplink signals. The BS and UE may communicate with an improved quality and save power, processing, and signaling resources that may have resulted from handling communications with poorer quality or insufficient transmission power for a particular beam arrangement.

Figure 7:
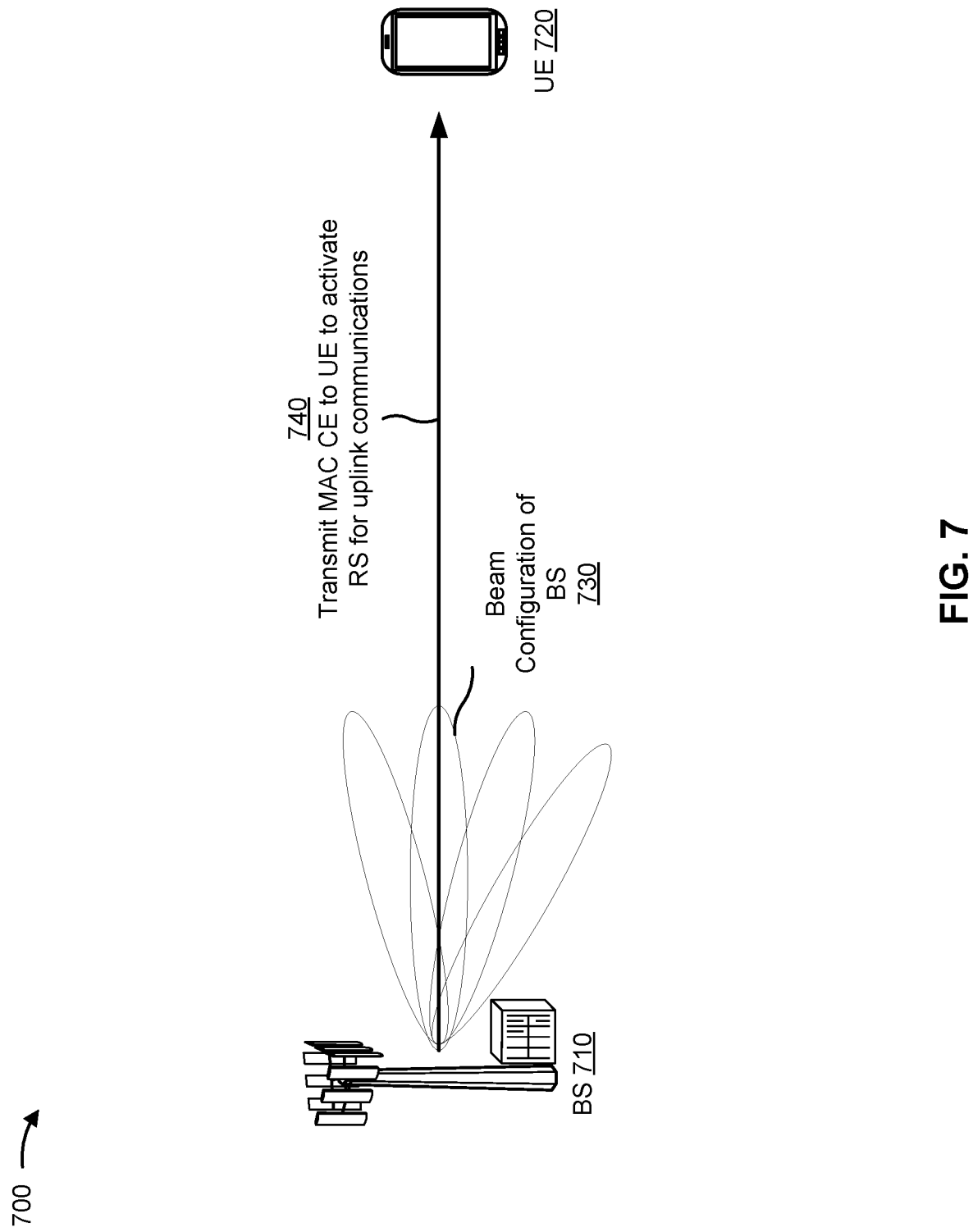
FIG. 7 is a diagram illustrating an example of activating or updating an RS for uplink communications, in accordance with various aspects of the present disclosure.

FIG. 7 is a diagram illustrating an example 700 of activating or updating an RS for uplink communications, in accordance with various aspects of the present disclosure. FIG. 7 shows a BS 710 that may communicate with a UE 720 using a beam configuration 730.

As shown by reference number 740, BS 710 may transmit a message to UE 720, which in this example is a MAC CE. The MAC CE may instruct UE 720 to activate or update an RS corresponding to uplink communications from UE 720. The RS from UE 720 may be, for example, a path loss RS for a physical uplink channel, such as a physical uplink control channel (PUCCH) for control communications and/ or a physical uplink shared channel (PUSCH) for data communications. The RS from UE 720 may be, in another example, an aperiodic sounding RS (AP-SRS) or a semi-persistent sounding RS (SP-SRS).

BS 710 may be configured to use beam configuration 730 to transmit the message. Beam configuration 730 may be one or more transmission control indication (TCI) states, each of which specifies one or more antenna ports and/or a direction for an active beam for communications towards UE 720. Beam configuration 730 may have one or more TCI state identifiers for each bandwidth part of one or more common carriers.

BS 710 may be configured to use beam configuration 730 for control communications and data communications to and from UE 720, once BS 710 determines that UE 720 is configured with a beam configuration that corresponds to beam configuration 730 of BS 710.

In some aspects, the message may activate another, second RS with a resource (e.g., antenna port) that is quasi co-located (QCLed) or spatially correlated to a resource for the RS, which may be referred to as a first RS. The first RS and/or the second RS may be a channel state information reference signal (CSI-RS), synchronization signal block (SSB), tracking RS, demodulation RS, or path tracking RS, another type of UE RS, and/or the like.

As indicated above, FIG. 7 is provided as an example. Other examples may differ from what is described with regard to FIG. 7.

Figure 8:
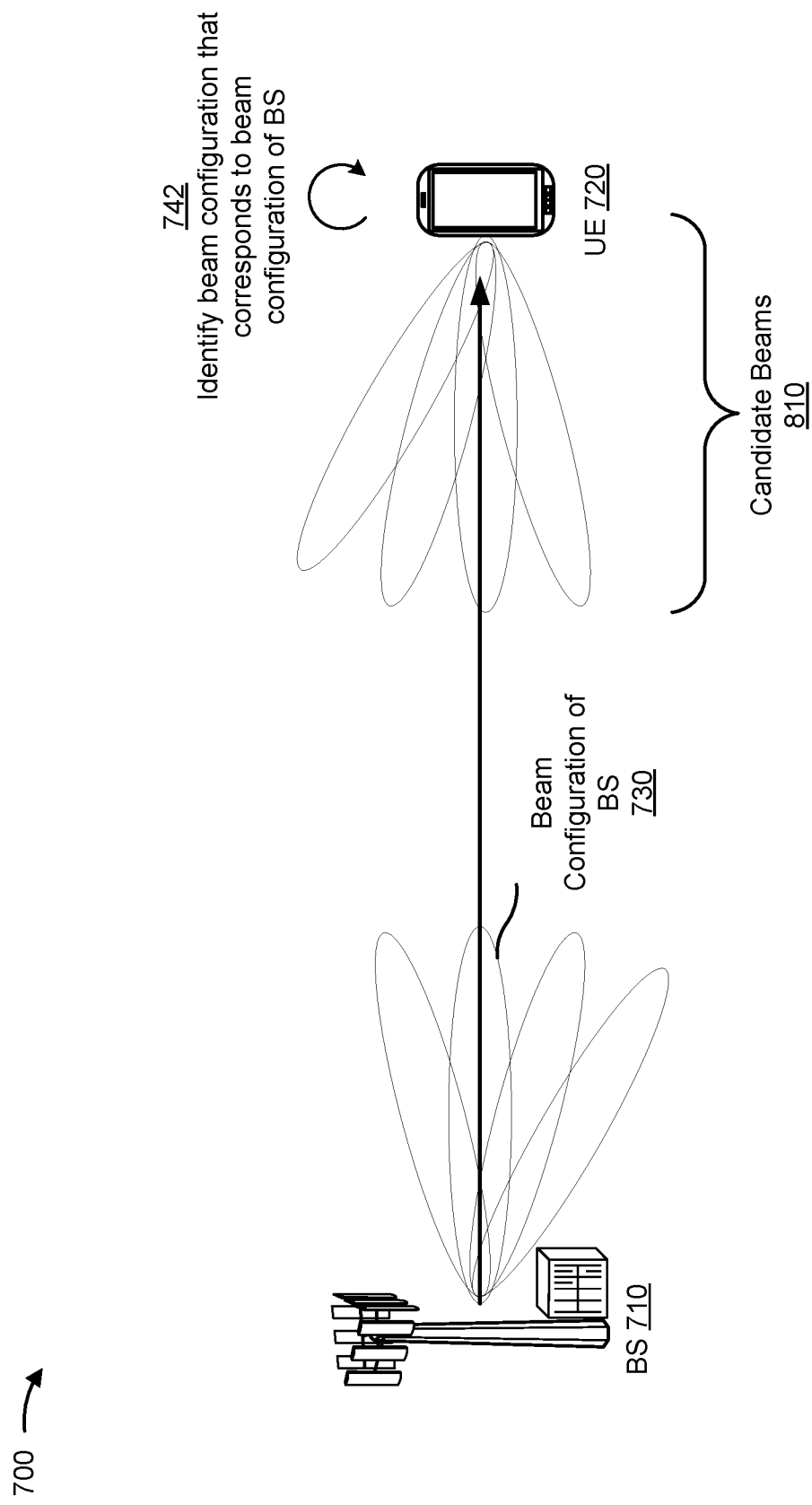
FIG. 8 is a diagram illustrating the example for activating or updating an RS for uplink communications, in accordance with various aspects of the present disclosure.

FIG. 8 is a diagram illustrating example 700 for activating or updating an RS for uplink communications, in accordance with various aspects of the present disclosure.

As shown by reference number 742, UE 720 may identify a beam configuration of UE 720 that corresponds to beam configuration 730 of BS 710. If UE 720 had already identified and stored (in an active TCI list) the beam configuration of UE 720, a time period for identifying the beam configuration for UE 720 may be shorter than if UE 720 had not identified and stored the beam configuration for UE 720. Extra time may be needed for UE 720 to identify the beam configuration for UE 720 from among a plurality of candidate beams 810.

To identify the beam configuration for UE 720 from among a plurality of candidate beams 810, UE 720 may perform a beam sweep. A beam sweep may include transmitting beams in all predefined directions in a burst at a regular interval. UE 720 may then perform one or more measurements on one or more samples of candidate beams 810. UE 720 may identify the beam configuration of UE 720 that corresponds to beam configuration 730 of BS 710.

As indicated above, FIG. 8 is provided as an example. Other examples may differ from what is described with regard to FIG. 8.

Figure 9:
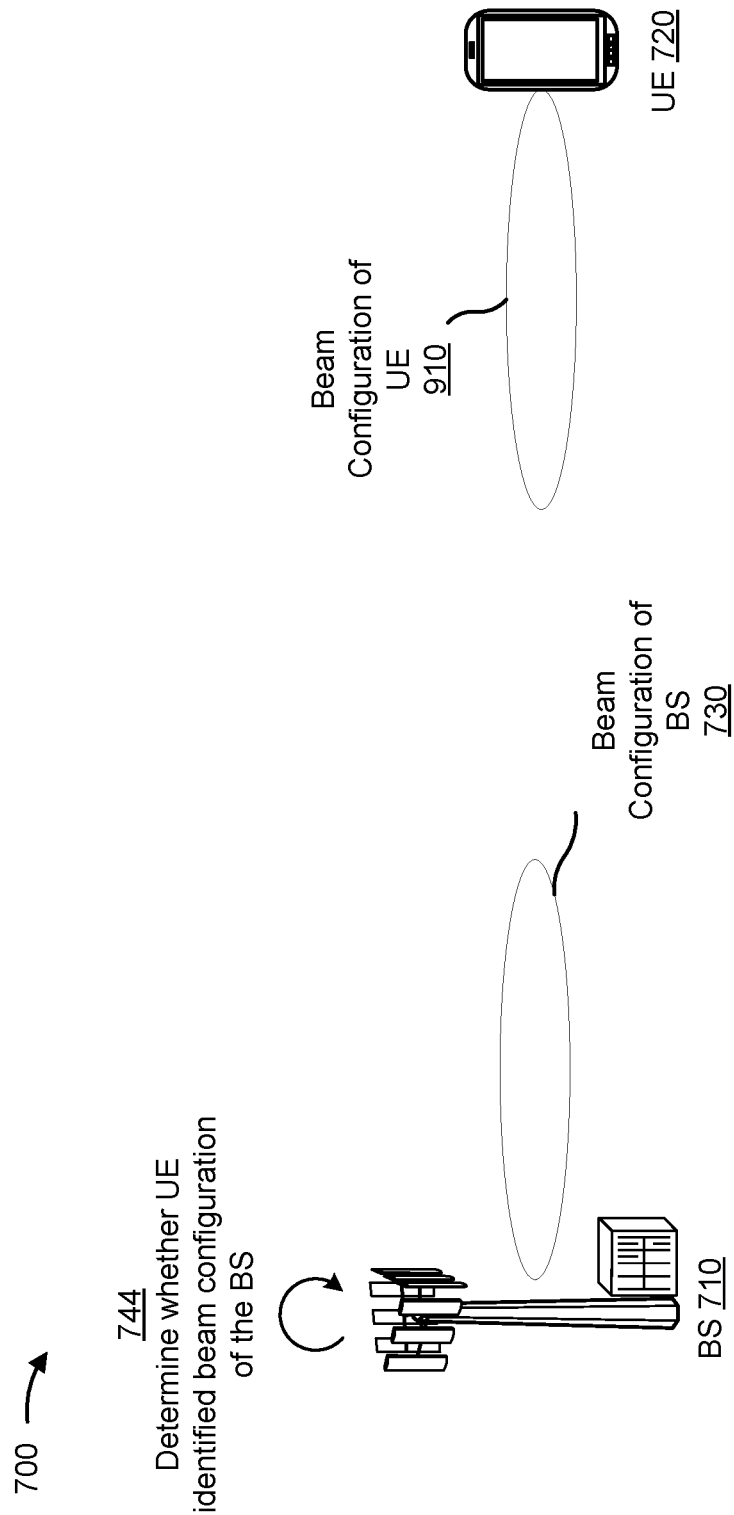
FIG. 9 is a diagram illustrating the example for activating or updating an RS for uplink communications, in accordance with various aspects of the present disclosure.

FIG. 9 is a diagram illustrating example 700 for activating or updating an RS for uplink communications, in accordance with various aspects of the present disclosure.

In FIG. 9, UE 720 may have identified a beam configuration of UE 720 that corresponds to beam configuration 730 of BS 710. In some aspects, beam configuration 730 of BS 710 may be in a beam pair link with beam configuration 910 of UE 720. As shown by reference number 744, BS 710 may determine whether UE 720 has identified beam configuration 910 of UE 720 corresponding to beam configuration 730 of BS 710. This may take one time period if beam configuration 910 of UE 720 if UE 720 had already identified and stored beam configuration 910 (known) on UE 720. This may take a longer period of time if UE 720 had not already stored and identified beam configuration 910 on UE 720.

As indicated above, FIG. 9 is provided as an example. Other examples may differ from what is described with regard to FIG. 9.

Figure 10:
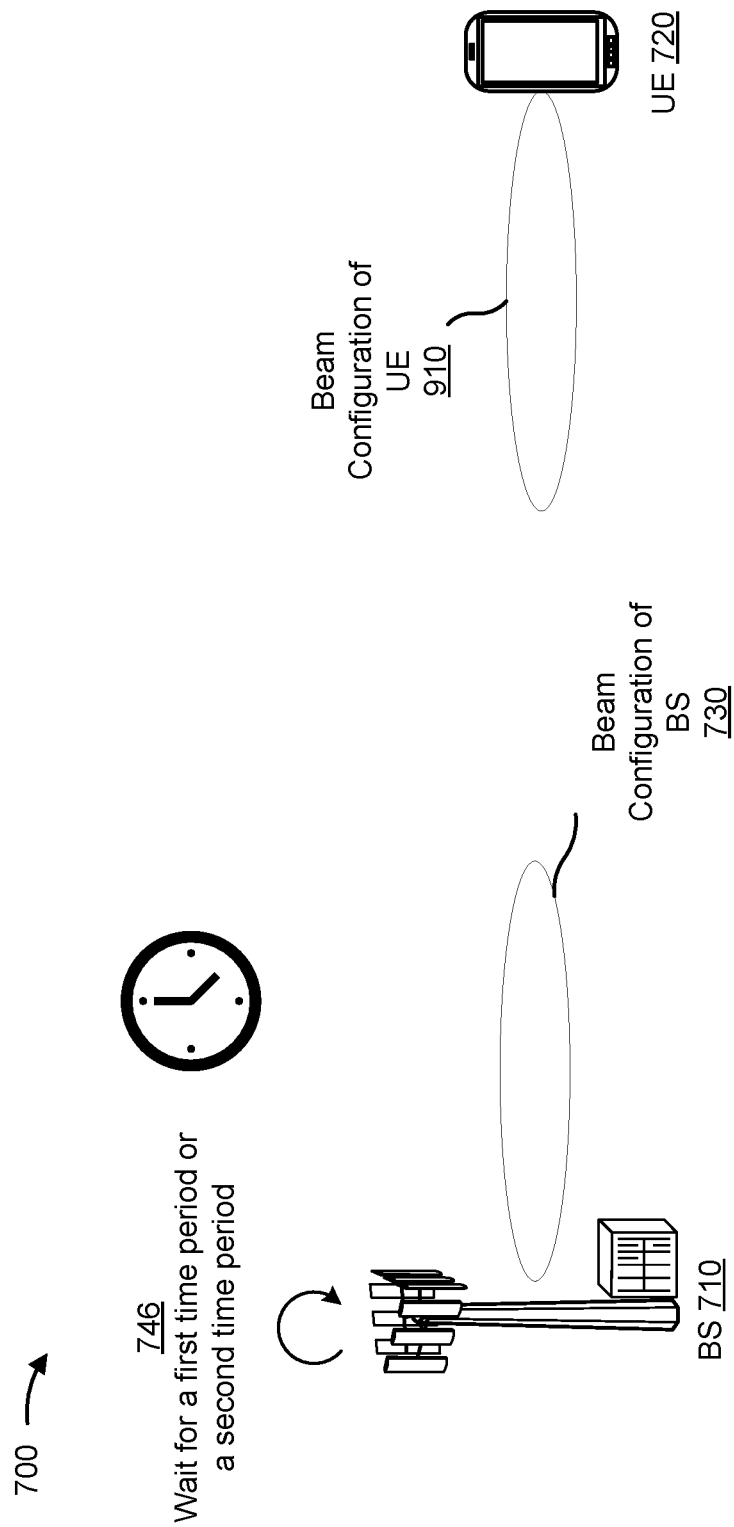
FIG. 10 is a diagram illustrating the example for activating or updating an RS for uplink communications, in accordance with various aspects of the present disclosure.

FIG. 10 is a diagram illustrating example 700 for activating or updating an RS for uplink communications, in accordance with various aspects of the present disclosure.

As shown by reference number 746, BS 710 may wait a first time period based at least in part on a determination that UE 720 has already identified and stored beam configuration 910 of UE 720, or BS 710 may wait a second time period based at least in part on a determination that UE 720 has not already identified beam configuration 910 of UE 720. BS 710 may determine that the UE identified the beam configuration of BS 710 based at least in part on a determination that at least one of: the message is transmitted by BS 710 within a certain time period (e.g., 1280 ms) since a transmission was received from a resource UE 720 is configured to use for beam reporting or measurement, a measurement report for beam configuration 910 is received from UE 720, beam configuration 730 for BS 710 remains detectable during a switch period for the beam configuration of BS 720, an SSB associated with beam configuration 730 remains detectable during a switch period for beam configuration 730, or an SNR of beam configuration 730 is greater than a threshold (e.g., −3 dB). In some aspects, conditions for determining whether UE 720 has already identified beam configuration 910 of BS 710 (TCI state is known) may include those defined in 3GPP TS 38.133 V16.1.0 (2019-09).

In some aspects, the first time period may include a time period that BS 710 determines is needed for UE 720 to transmit the RS in order to find an uplink transmit power for communications. The first time period may include a time period that BS 710 determines is needed for UE 720 to perform measurements on a specified number of (e.g., 5 or fewer) samples for beam detection. The specified number of samples may be consecutive samples for layer 3 filtering during a connected state of a discontinuous reception (C-DRX) mode. After a specified (e.g., fifth) measurement sample, UE 720 may settle a tracking filter of UE 720 and transmit uplink communications with a transmission power determined based at least in part on information from using the tracking filter.

In some aspects, UE 720 may use known measurements for an RS. For example, UE 720 may reuse a higher layer filtered RSRP for pathloss measurement after receiving an activation MAC CE. A filtered RSRP value for a previous pathloss RS may be used before communication proceeds at a next slot after a fifth measurement sample (referred to as an application time), where the first measurement sample corresponds to be a first instance, 3 ms after sending ACK for the MAC CE.

In some aspects, the second time period may include a time that BS 710 determines is needed for UE 720 to identify beam configuration 910 of UE 720, from among the plurality of candidate beam configurations 810, that corresponds to beam configuration 730 of BS 710. Extra time may be needed for UE 720 to perform layer 1 RSRP (L1-RSRP) measurement for receiving beam refinement, before filtering one or more RSRP values to update an uplink transmit power. UE 720 may use a filtered RSRP value for a previous pathloss RS for uplink signals until the L1-RSRP measurement is performed. The second time period may also include a time period that UE 720 takes to transmit the RS.

In some aspects, the second time period includes a time period that BS 710 determines is needed for UE 720 to perform measurements on more than a specified number of (e.g., more than 5) samples for beam detection. The more than the specified number of samples may be consecutive samples for layer 3 filtering during a C-DRX mode. In some aspects, the more than the specified number of samples may include a time to measure 8 samples or 24 samples. There may be 8 samples because there may be 8 samples in a time slot, for example.

In some aspects, an activation timeline should ensure that UE 720 performs measurements on a consecutive required number of samples. UE 720 may need consecutive samples to perform layer 3 filtering. In discontinuous reception (DRX) mode, UE 720 may sleep and wake up to receive signals at certain periods. If UE 720 is in DRX mode, an RS may be valid only if the RS falls in a time period of the C-DRX mode. Otherwise, there may be too much of a gap between samples, and accuracy may be lost. Therefore, BS 710 may wait, after activating an RS, for a time period sufficient to allow UE 720 to perform measurements on, for example, 5 back-to-back RS samples within one active DRX duration.

As indicated above, FIG. 10 is provided as an example. Other examples may differ from what is described with regard to FIG. 10.

Figure 11:
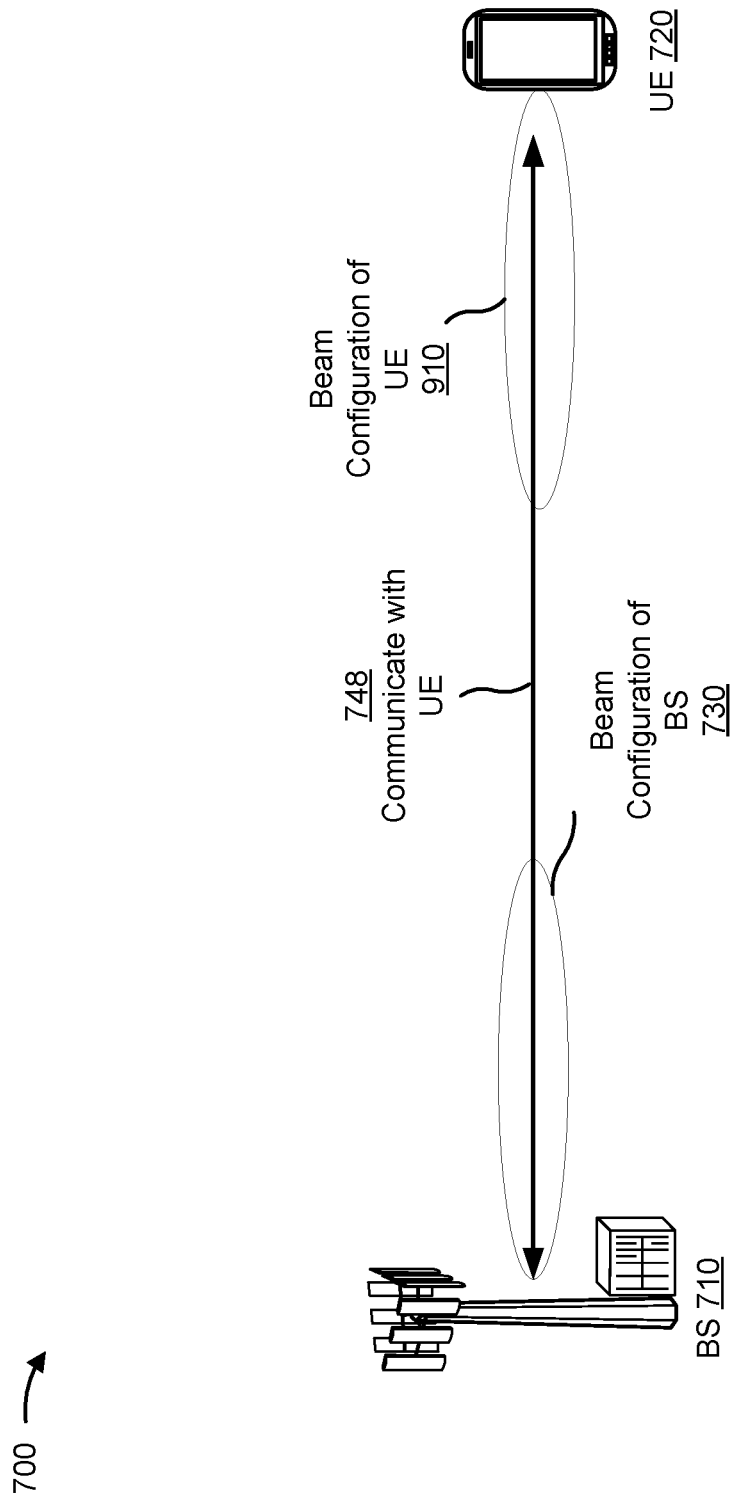
FIG. 11 is a diagram illustrating the example for activating or updating an RS for uplink communications, in accordance with various aspects of the present disclosure.

FIG. 11 is a diagram illustrating example 700 for activating or updating an RS for uplink communications, in accordance with various aspects of the present disclosure.

As shown by reference number 748, BS 710 may communicate with UE 720. These communications may include control communications and/or data communications distinct from a message to activate or update an RS for uplink communications. The communications may be downlink communications. The communications may be uplink communications.

In some aspects, BS 710 may transmit the message through a first cell and communicate with the UE through a second cell. The first cell may be a primary cell and the second cell may be a secondary cell or primary secondary cell. The first cell may be a secondary cell (or primary secondary cell) and the second cell may be a primary cell.

As indicated above, FIG. 11 is provided as an example. Other examples may differ from what is described with regard to FIG. 11.

Figure 12:
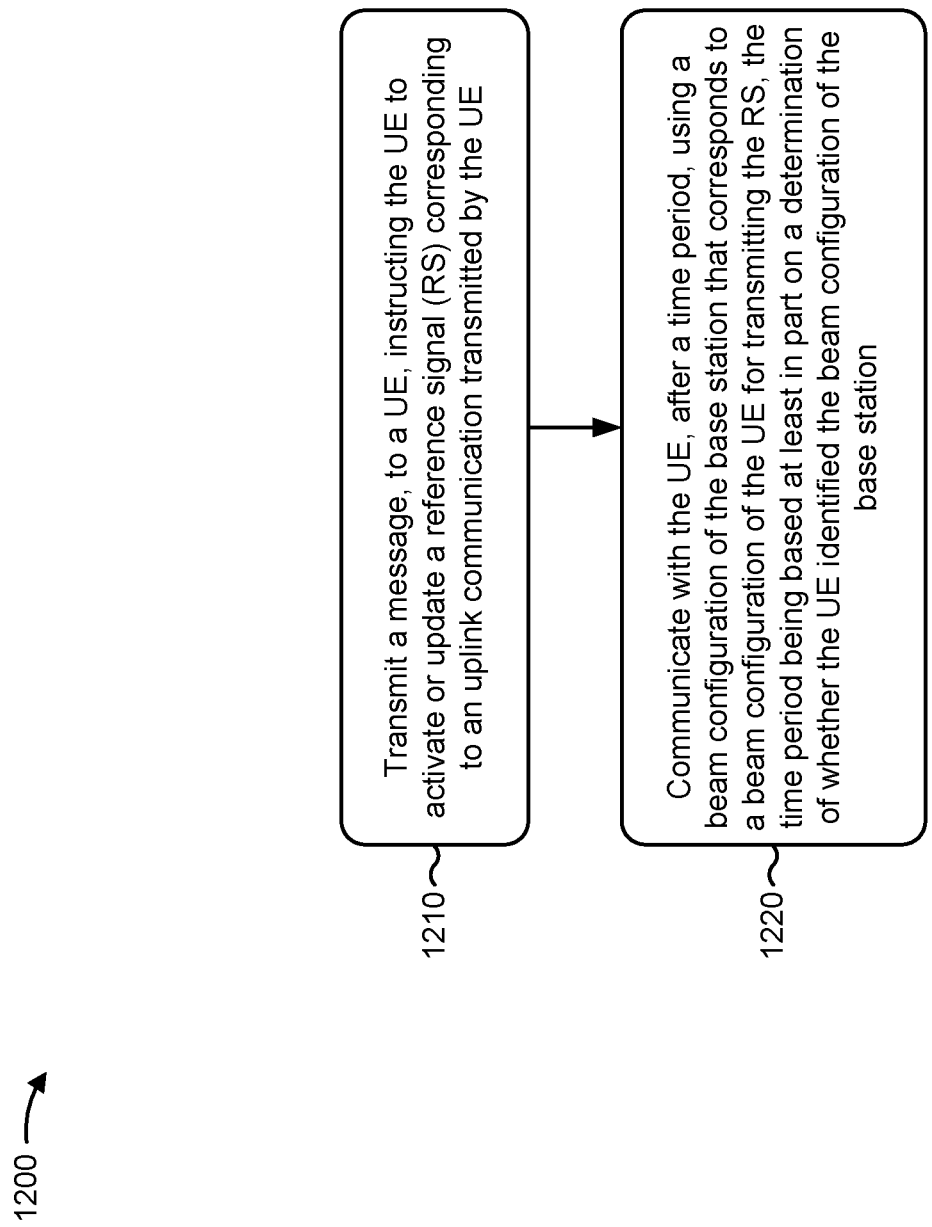
FIG. 12 is a diagram illustrating an example process performed, for example, by a base station, in accordance with various aspects of the present disclosure.

FIG. 12 is a diagram illustrating an example process 1200 performed, for example, by a base station, in accordance with various aspects of the present disclosure. Example process 1200 is an example where a base station (e.g., BS 110, BS 710, and/or the like) performs operations associated with reference signal updating timing for uplink signals.

As shown in FIG. 12, in some aspects, process 1200 may include transmitting a message, to a UE, instructing the UE to activate or update an RS corresponding to an uplink communication transmitted by the UE (block 1210). For example, the base station (e.g., using transmit processor 220, receive processor 238, controller/processor 240, memory 242, and/or the like) may transmit a message, to a UE, instructing the UE to activate or update an RS corresponding to an uplink communication transmitted by the UE, as described above in connection with FIGS. 7-10.

Process 1200 may include additional aspects, such as any single aspect or any combination of aspects described below and/or in connection with one or more other processes described elsewhere herein.

In a first aspect, the RS is a path loss RS for a physical uplink channel.

In a second aspect, alone or in combination with the first aspect, the RS is a path loss RS for an aperiodic uplink sounding RS or a semi-persistent uplink sounding RS.

In a third aspect, alone or in combination with one or more of the first and second aspects, the RS is one of a channel state information RS, a synchronization signal block, a tracking RS, a demodulation RS, a phase tracking RS, or a UE RS.

In a fourth aspect, alone or in combination with one or more of the first through third aspects, the second time period is longer than the first time period.

In a fifth aspect, alone or in combination with one or more of the first through fourth aspects, the first time period includes a time that the base station determines is needed for the UE to determine one or more combinations of time, frequency, and received power of the RS in order to find an uplink transmit power for communications.

In a sixth aspect, alone or in combination with one or more of the first through fifth aspects, the first time period includes a time that the base station determines is needed for the UE to perform measurements on a specified number of samples for beam detection. The specified number may be 5, or the specified number may be fewer than 5.

In a seventh aspect, alone or in combination with one or more of the first through sixth aspects, the specified number of samples are consecutive samples for layer 3 filtering during a connected state of a discontinuous reception mode.

In an eighth aspect, alone or in combination with one or more of the first through seventh aspects, the second time period includes a time that the base station determines is needed for the UE to identify the beam configuration of the UE, from among a plurality of candidate beam configurations, that corresponds to the beam configuration of the base station, and to transmit the RS.

In a ninth aspect, alone or in combination with one or more of the first through eighth aspects, the second time period includes a time that the base station determines is needed for the UE to perform measurements on more than a specified number of samples for beam detection.

In a tenth aspect, alone or in combination with one or more of the first through ninth aspects, the more than the specified number of samples are consecutive samples for layer 3 filtering during a connected state of a discontinuous reception mode.

In an eleventh aspect, alone or in combination with one or more of the first through tenth aspects, process 1200 further comprises determining that the UE identified the beam configuration of the base station based at least in part on a determination that at least one of the message is transmitted by the base station within a certain time period since a transmission was received from a resource the UE is configured to use for beam reporting or measurement, a measurement report for the beam configuration is received from the UE, the beam configuration for the base station remains detectable during a switch period for the beam configuration of the base station, a synchronization signal block associated with the beam configuration remains detectable during a switch period for the beam configuration of the base station, or an SNR of the beam configuration of the base station is greater than a threshold.

In a twelfth aspect, alone or in combination with one or more of the first through eleventh aspects, the threshold is −3 decibels (−3 dB).

In a thirteenth aspect, alone or in combination with one or more of the first through twelfth aspects, the certain time period is 1280 ms.

In a fourteenth aspect, alone or in combination with one or more of the first through thirteenth aspects, the message is one of a downlink control information (DCI) message, a MAC CE message, or a radio resource control (RRC) message.

As further shown in FIG. 12, in some aspects, process 1200 may include communicating with the UE, after a time period, using a beam configuration of the base station that corresponds to a beam configuration of the UE for transmitting the RS. In some aspects, the time period is based at least in part on a determination of whether the UE identified the beam configuration of the base station (block 1220). For example, the base station (e.g., using transmit processor 220, receive processor 238, controller/processor 240, memory 242, and/or the like) may communicate with the UE, after a time period, using a beam configuration of the base station that corresponds to a beam configuration of the UE for transmitting the RS, as described above in connection with FIGS. 7-10. In some aspects, the time period is based at least in part on a determination of whether the UE identified the beam configuration of the base station.

In a fifteenth aspect, alone or in combination with one or more of the first through fourteenth aspects, transmitting the message includes transmitting the message through a first cell, and communicating with the UE includes communicating with the UE through a second cell.

In a sixteenth aspect, alone or in combination with one or more of the first through fifteenth aspects, the first cell is a primary cell and the second cell is a secondary cell.

In a seventeenth aspect, alone or in combination with one or more of the first through sixteenth aspects, the first cell is a secondary cell and the second cell is a primary cell.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
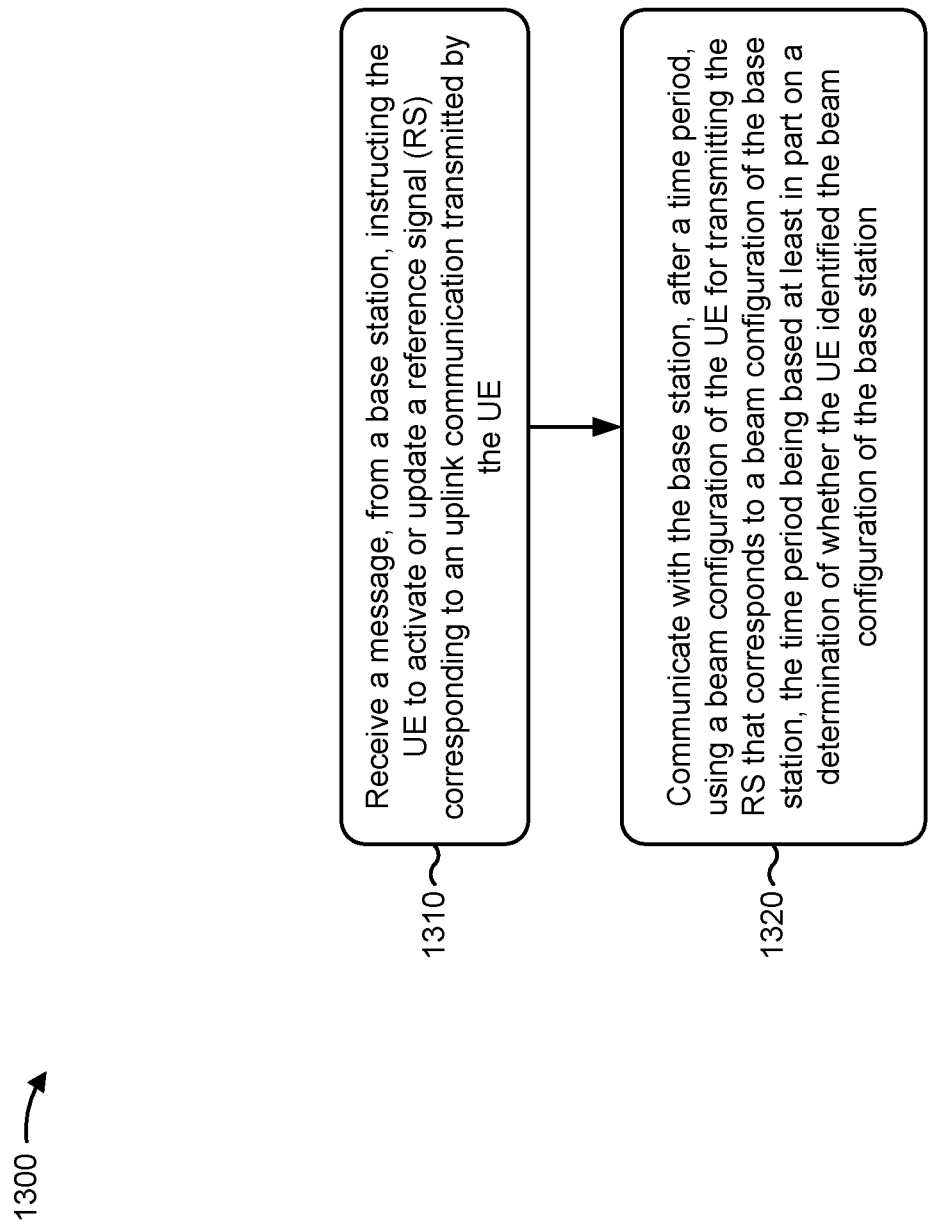
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where a UE (e.g., UE 120, UE 720, and/or the like) performs operations associated with reference signal updating timing for uplink signals.

As shown in FIG. 13, in some aspects, process 1300 may include receiving a message, from a base station, instructing the UE to activate or update an RS corresponding to an uplink communication transmitted by the UE (block 1310). For example, the UE (e.g., using transmit processor 264, receive processor 258, controller/processor 280, memory 282, and/or the like) may receive a message, from a base station, instructing the UE to activate or update an RS corresponding to an uplink communication transmitted by the UE, as described above in connection with FIGS. 7-10.

Process 1300 may include additional aspects, such as any single aspect or any combination of aspects described below and/or in connection with one or more other processes described elsewhere herein.

In a first aspect, the RS is a path loss RS for a physical uplink channel.

In a second aspect, alone or in combination with the first aspect, the RS is a path loss RS for an aperiodic uplink sounding RS or a semi-persistent uplink sounding RS.

In a third aspect, alone or in combination with one or more of the first and second aspects, the RS is one of a channel state information RS, a synchronization signal block, a tracking RS, a demodulation RS, a phase tracking RS, or a UE RS.

In a fourth aspect, alone or in combination with one or more of the first through third aspects, the time period is longer if the UE had not identified and stored the beam configuration of the base station than if the UE had identified and stored the beam configuration of the base station.

In a fifth aspect, alone or in combination with one or more of the first through fourth aspects, process 1300 further comprises determining, during the time period, one or more combinations of time, frequency, and received power of the RS in order to find an uplink transmit power for communications.

In a sixth aspect, alone or in combination with one or more of the first through fifth aspects, process 1300 further comprises performing, during the time period, measurements on a specified number of samples for beam detection. The specified number may be 5 or fewer.

In a seventh aspect, alone or in combination with one or more of the first through sixth aspects, the specified number of samples are consecutive samples for layer 3 filtering during a connected state of a discontinuous reception mode.

In an eighth aspect, alone or in combination with one or more of the first through seventh aspects, process 1300 further comprises determining, during the time period, the beam configuration of the UE, from among a plurality of candidate beam configurations, that corresponds to the beam configuration of the base station.

In a ninth aspect, alone or in combination with one or more of the first through eighth aspects, process 1300 further comprises performing, during the time period, measurements on more than the specified number of samples for beam detection.

In a tenth aspect, alone or in combination with one or more of the first through ninth aspects, the more than the specified number of samples are consecutive samples for layer 3 filtering during a connected state of a discontinuous reception mode.

In an eleventh aspect, alone or in combination with one or more of the first through tenth aspects, process 1300 further comprises transmitting a measurement report for the beam configuration of the base station.

In a twelfth aspect, alone or in combination with one or more of the first through eleventh aspects, the message is one of a DCI message, a MAC CE message, or an RRC message.

As further shown in FIG. 13, in some aspects, process 1300 may include communicating with the base station, after a time period, using a beam configuration of the UE for transmitting the RS that corresponds to a beam configuration of the base station, the time period being based at least in part on a determination of whether the UE identified the beam configuration of the base station and a reference signal associated with the beam configuration (block 1320). For example, the UE (e.g., using transmit processor 264, receive processor 258, controller/processor 280, memory 282, and/or the like) may communicate with the base station, after a time period, using a beam configuration of the UE for transmitting the RS that corresponds to a beam configuration of the base station, as described above in connection with FIGS. 7-10. In some aspects, the time period is based at least in part on a determination of whether the UE identified the beam configuration of the base station and a reference signal associated with the beam configuration. The reference signal may be an SSB.

In a thirteenth aspect, alone or in combination with one or more of the first through twelfth aspects, the message is received through a first cell, and the communicating with the base station is through a second cell.

In a fourteenth aspect, alone or in combination with one or more of the first through thirteenth aspects, the first cell is a primary cell and the second cell is a secondary cell.

In a fifteenth aspect, alone or in combination with one or more of the first through fourteenth aspects, the first cell is a secondary cell and the second cell is a primary cell.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

Figure 14:
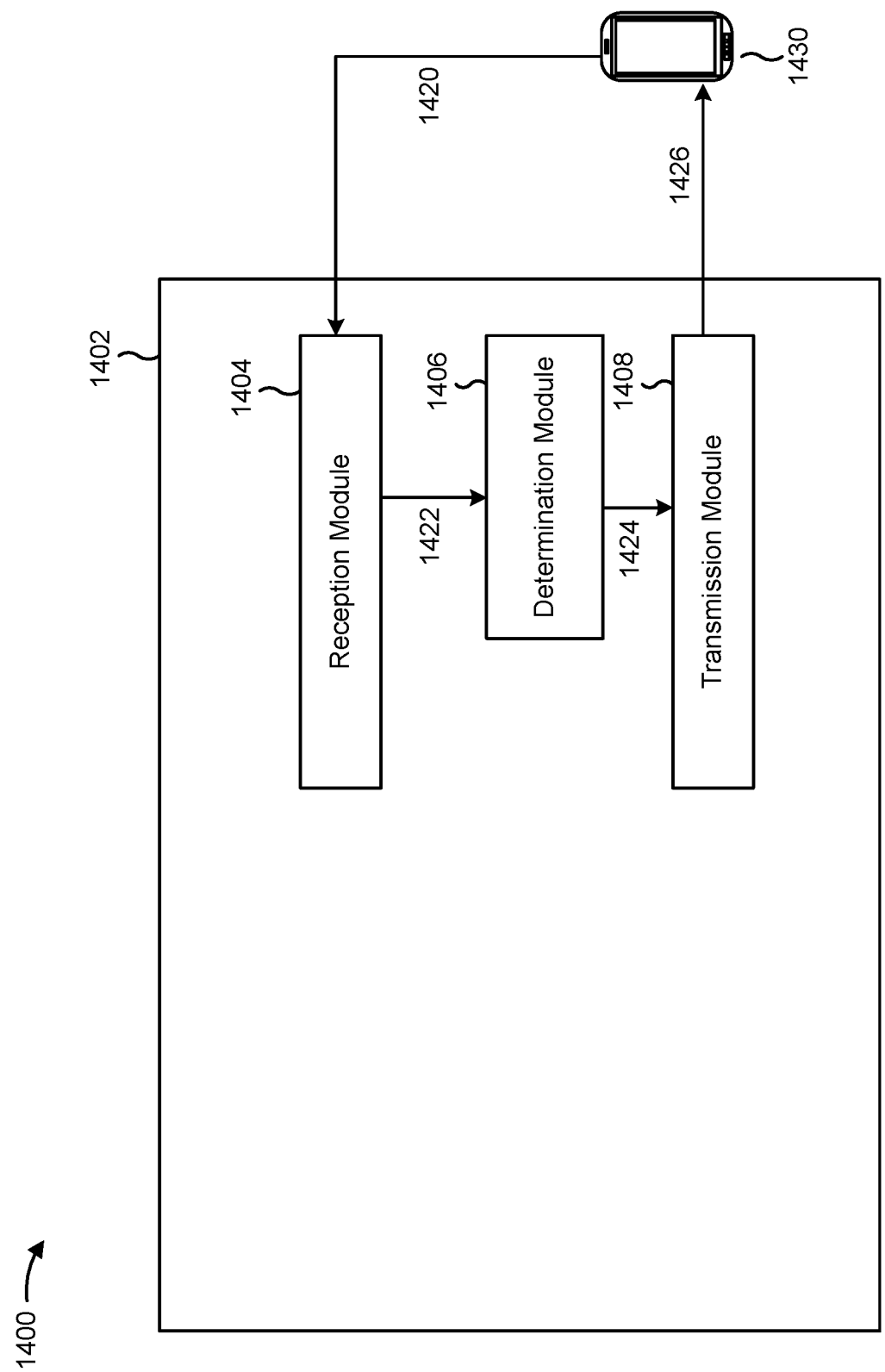
FIG. 14 is a conceptual data flow diagram illustrating data flow between different modules/means/components in an example apparatus.

FIG. 14 is a conceptual data flow diagram 1400 illustrating data flow between different modules/means/components in an example apparatus 1402. The apparatus 1402 may be a BS (e.g., BS 110, BS 710, and/or the like). In some aspects, the apparatus 1402 includes a reception module 1404, a determination module 1406, and/or a transmission module 1408.

Reception module 1404 may receive data 1420 from UE 1430 and transmit data 1422 to determination module 1406.

In some aspects, determination module 1406 may determine that the UE identified a beam configuration of the base station. Transmission module 1408 may receive information about the UE identifying a beam configuration, as data 1424, and provide communications as data 1426.

Reception module 1404 and transmission module 1408 may communicate with the UE, after a time period, using a beam configuration of the base station that corresponds to a beam configuration of the UE for transmitting the RS, the time period being based at least in part on a determination of whether the UE identified the beam configuration of the base station The apparatus may include additional modules that perform each of the blocks of the algorithm in the aforementioned method 1200 of FIG. 12 and/or the like. Each block in the aforementioned method 1200 of FIG. 12 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or a combination thereof.

The number and arrangement of modules shown in FIG. 14 are provided as an example. In practice, there may be additional modules, fewer modules, different modules, or differently arranged modules than those shown in FIG. 14. Furthermore, two or more modules shown in FIG. 14 may be implemented within a single module, or a single module shown in FIG. 14 may be implemented as multiple, distributed modules. Additionally, or alternatively, a set of modules (e.g., one or more modules) shown in FIG. 14 may perform one or more functions described as being performed by another set of modules shown in FIG. 14.

Figure 15:
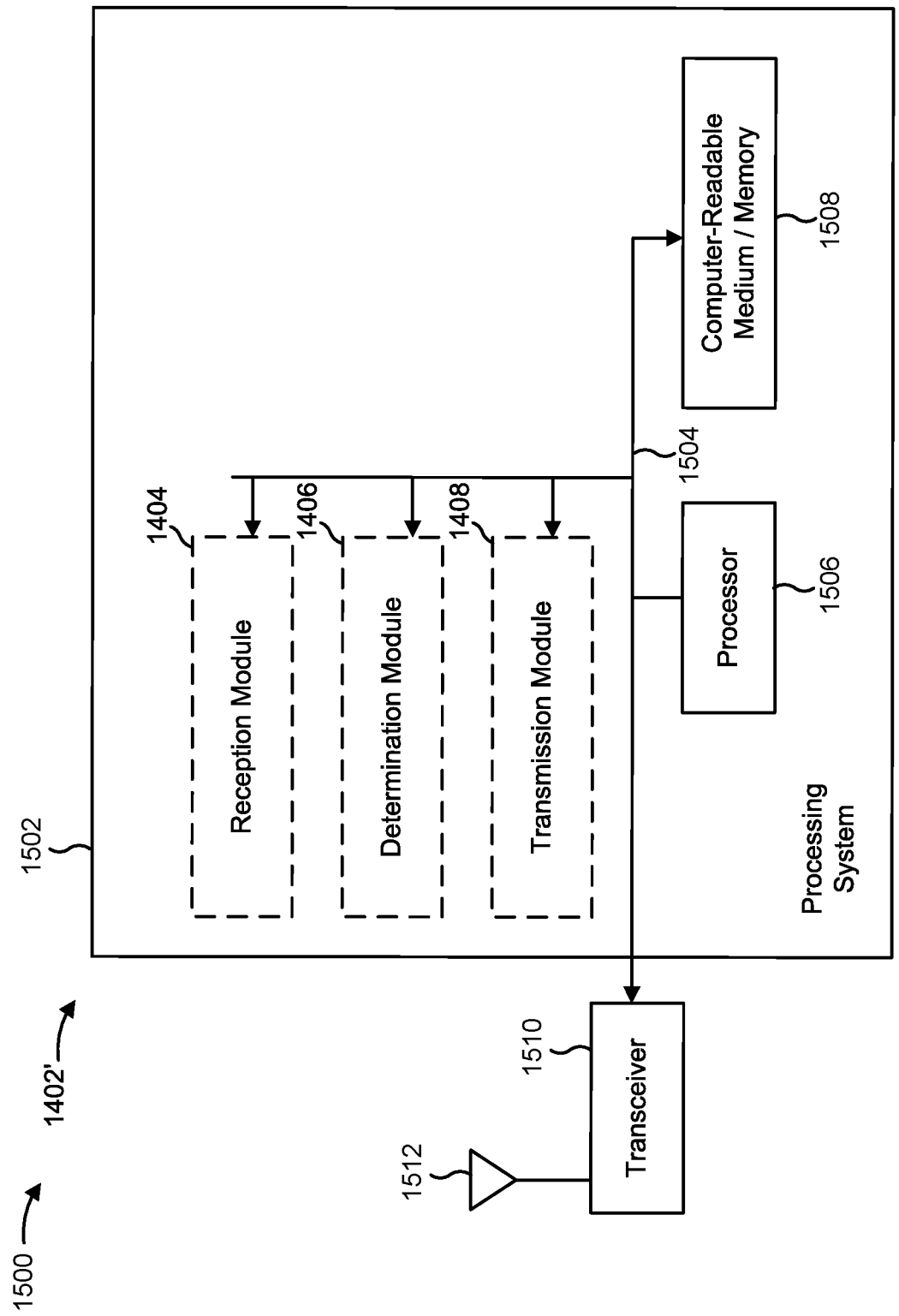
FIG. 15 is a diagram illustrating an example of a hardware implementation for an apparatus employing a processing system.

FIG. 15 is a diagram 1500 illustrating an example of a hardware implementation for an apparatus 1402' employing a processing system 1502. The apparatus 1402' may be a BS.

The processing system 1502 may be implemented with a bus architecture, represented generally by the bus 1504. The bus 1504 may include any number of interconnecting buses and bridges depending on the specific application of the processing system 1502 and the overall design constraints. The bus 1504 links together various circuits including one or more processors and/or hardware modules, represented by the processor 1506, the modules 1404, 1406, 1408, and the computer-readable medium/memory 1508. The bus 1504 may also link various other circuits such as timing sources, peripherals, voltage regulators, and power management circuits, which are well known in the art, and therefore will not be described any further.

The processing system 1502 may be coupled to a transceiver 1510. The transceiver 1510 is coupled to one or more antennas 1512. The transceiver 1510 provides a means for communicating with various other apparatuses over a transmission medium. The transceiver 1510 receives a signal from the one or more antennas 1512, extracts information from the received signal, and provides the extracted information to the processing system 1502, specifically the reception module 1404. In addition, the transceiver 1510 receives information from the processing system 1502, specifically the transmission module 1408, and based at least in part on the received information, generates a signal to be applied to the one or more antennas 1512. The processing system 1502 includes a processor 1506 coupled to a computer-readable medium/memory 1508. The processor 1506 is responsible for general processing, including the execution of software stored on the computer-readable medium/memory 1508. The software, when executed by the processor 1506, causes the processing system 1502 to perform the various functions described herein for any particular apparatus. The computer-readable medium/memory 1508 may also be used for storing data that is manipulated by the processor 1506 when executing software. The processing system further includes at least module 1406. The modules may be software modules running in the processor 1506, resident/stored in the computer readable medium/memory 1508, one or more hardware modules coupled to the processor 1506, or a combination thereof. The processing system 1502 may be a component of the eNB or gNB 110 and may include the memory 242 and/or at least one of the TX MIMO processor 230, the RX processor 238, and/or the controller/processor 240.

In some aspects, the apparatus 1402/1402' for wireless communication includes means for transmitting a message, to a UE, instructing the UE to activate or update an RS corresponding to an uplink communication transmitted by the UE, and means for communicating with the UE, after a time period, using a beam configuration of the base station that corresponds to a beam configuration of the UE for transmitting the RS, the time period being based at least in part on a determination of whether the UE identified the beam configuration of the base station. The aforementioned means may be one or more of the aforementioned modules of the apparatus 1402 and/or the processing system 1502 of the apparatus 1402' configured to perform the functions recited by the aforementioned means. As described elsewhere herein, the processing system 1502 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 15 is provided as an example. Other examples may differ from what is described in connection with FIG. 15.

Figure 16:
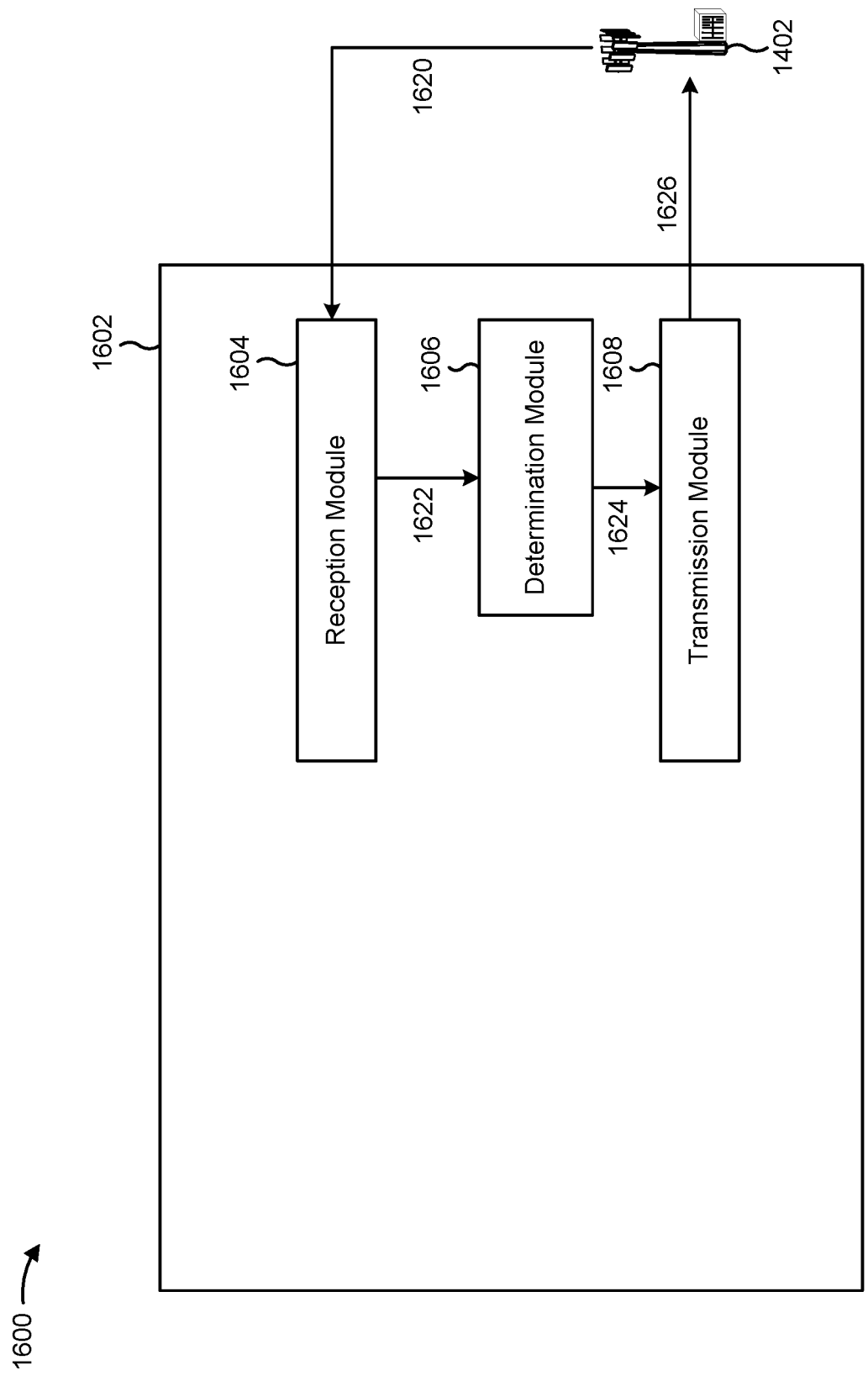
FIG. 16 is a conceptual data flow diagram illustrating data flow between different modules/means/components in an example apparatus.

FIG. 16 is a conceptual data flow diagram 1600 illustrating data flow between different modules/means/components in an example apparatus 1602. The apparatus 1602 may be a UE, such as UE 1430. In some aspects, the apparatus 1602 includes a reception module 1604, a determination module 1606, and a transmission module 1608.

In some aspects, reception module 1604 may receive, as data 1620 from base station 1402, a message, from a base station, instructing the UE to activate or update an RS corresponding to an uplink communication transmitted by the UE. Related data may be passed as data 1622. Determination module 1606 may determine, during a time period, one or more combinations of time, frequency, and received power of the RS in order to find an uplink transmit power for communications. Such determinations may be passed to transmission module 1608 as data 1624. Reception module 1604 and transmission module 1608 may communicate with the base station with data 1620 and data 626, after a time period, using a beam configuration of the UE for transmitting the RS that corresponds to a beam configuration of the base station, the time period being based at least in part on a determination of whether the UE identified the beam configuration of the base station.

The apparatus may include additional modules that perform each of the blocks of the algorithm in the aforementioned method 1300 of FIG. 13 and/or the like. Each block in the aforementioned method 1300 of FIG. 13, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or a combination thereof.

The number and arrangement of modules shown in FIG. 16 are provided as an example. In practice, there may be additional modules, fewer modules, different modules, or differently arranged modules than those shown in FIG. 16. Furthermore, two or more modules shown in FIG. 16 may be implemented within a single module, or a single module shown in FIG. 16 may be implemented as multiple, distributed modules. Additionally, or alternatively, a set of modules (e.g., one or more modules) shown in FIG. 16 may perform one or more functions described as being performed by another set of modules shown in FIG. 16.

Figure 17:
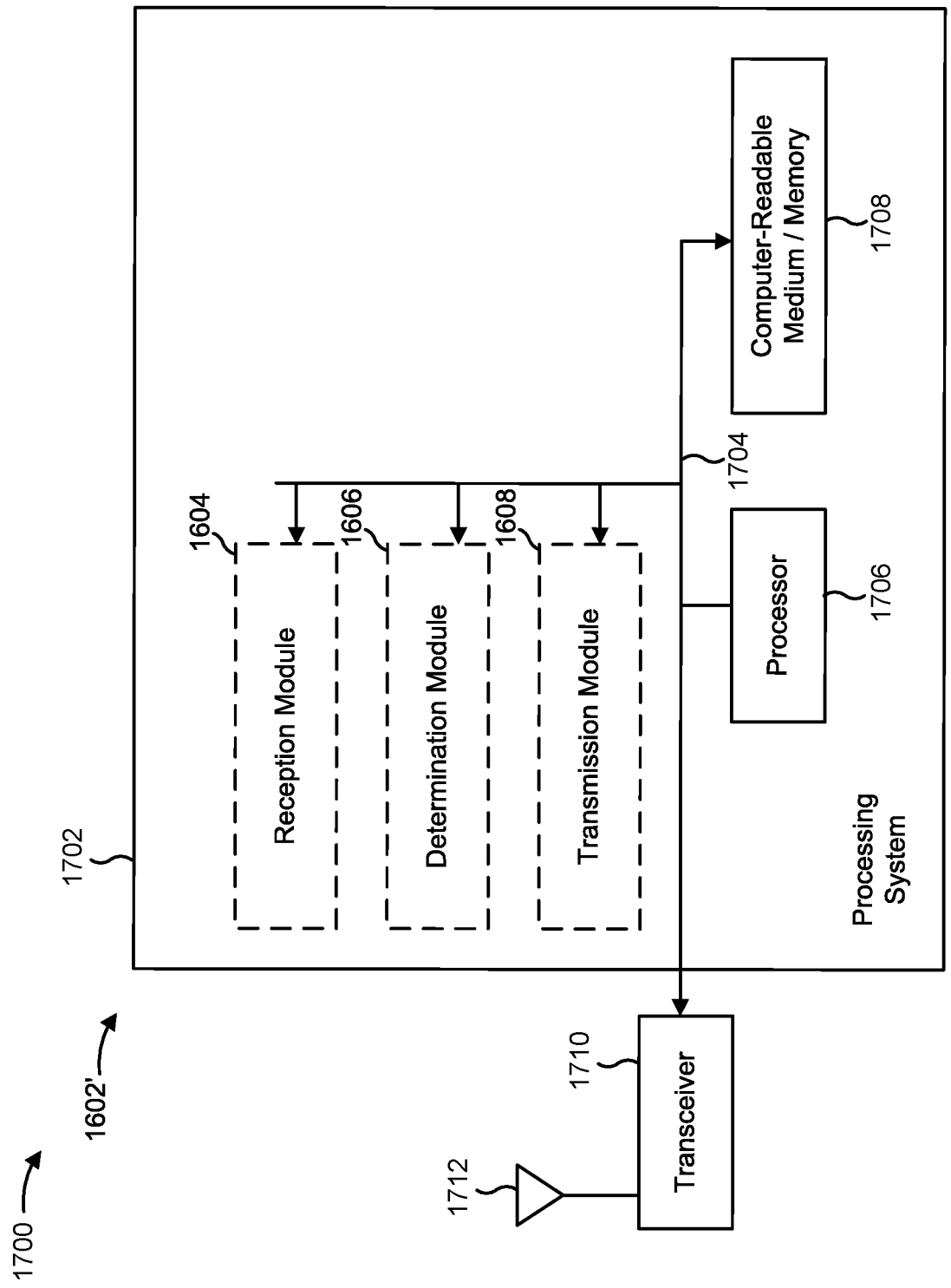
FIG. 17 is a diagram illustrating an example of a hardware implementation for an apparatus employing a processing system.

FIG. 17 is a diagram 1700 illustrating an example of a hardware implementation for an apparatus 1602' employing a processing system 1702. The apparatus 1602' may be a UE.

The processing system 1702 may be implemented with a bus architecture, represented generally by the bus 1704. The bus 1704 may include any number of interconnecting buses and bridges depending on the specific application of the processing system 1702 and the overall design constraints. The bus 1704 links together various circuits including one or more processors and/or hardware modules, represented by the processor 1706, the modules 1604, 1606, 1608, and the computer-readable medium/memory 1708. The bus 1704 may also link various other circuits such as timing sources, peripherals, voltage regulators, and power management circuits, which are well known in the art, and therefore will not be described any further.

The processing system 1702 may be coupled to a transceiver 1710. The transceiver 1710 is coupled to one or more antennas 1712. The transceiver 1710 provides a means for communicating with various other apparatuses over a transmission medium. The transceiver 1710 receives a signal from the one or more antennas 1712, extracts information from the received signal, and provides the extracted information to the processing system 1702, specifically the reception module 1604. In addition, the transceiver 1710 receives information from the processing system 1702, specifically the transmission module 1608, and based at least in part on the received information, generates a signal to be applied to the one or more antennas 1712. The processing system 1702 includes a processor 1706 coupled to a computer-readable medium/memory 1708. The processor 1706 is responsible for general processing, including the execution of software stored on the computer-readable medium/memory 1708. The software, when executed by the processor 1706, causes the processing system 1702 to perform the various functions described herein for any particular apparatus. The computer-readable medium/memory 1708 may also be used for storing data that is manipulated by the processor 1706 when executing software. The processing system further includes at least one of the modules 1606, 1610, 1612. The modules may be software modules running in the processor 1706, resident/stored in the computer readable medium/memory 1708, one or more hardware modules coupled to the processor 1706, or a combination thereof. The processing system 1702 may be a component of the UE 120 and may include the memory 282 and/or at least one of the TX MIMO processor 266, the RX processor 258, and/or the controller/processor 280.

In some aspects, the apparatus 1702/1602' for wireless communication includes means for receiving a message, from a base station, instructing the UE to activate or update an RS corresponding to an uplink communication transmitted by the UE and communicating with the base station, after a time period, using a beam configuration of the UE for transmitting the RS that corresponds to a beam configuration of the base station, the time period being based at least in part on a determination of whether the UE identified the beam configuration of the base station. The aforementioned means may be one or more of the aforementioned modules of the apparatus 1602 and/or the processing system 1702 of the apparatus 1602' configured to perform the functions recited by the aforementioned means. As described elsewhere herein, the processing system 1702 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 17 is provided as an example. Other examples may differ from what is described in connection with FIG. 17.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network node, comprising:

transmitting a message, to a user equipment (UE), instructing the UE to activate or update a reference signal (RS) corresponding to an uplink communication; and communicating with the UE, after a first time period or a second time period longer than the first time period, using a beam configuration of the network node that corresponds to a beam configuration of the UE for the RS, wherein:

the first time period is based at least in part on a determination that the UE identified the beam configuration of the network node, or the second time period is based at least in part on a determination that the UE did not identify the beam configuration of the network node, and at least one of the first time period or the second time period includes a time for the UE to determine a received power of the reference signal in order to find an uplink transmit power for one or more uplink communications.

2. The method of claim 1, wherein the RS is a path loss RS for a physical uplink channel.

3. The method of claim 1, wherein the RS is a path loss RS for an aperiodic uplink sounding RS or a semi-persistent uplink sounding RS.

4. The method of claim 1, wherein the RS is one of a channel state information RS, a synchronization signal block, a tracking RS, a demodulation RS, a phase tracking RS, or a UE RS.

5. The method of claim 1, further comprising one of:
determining the first time period based at least in part on the determination that the UE identified the beam configuration of the network node, or
determining the second time period based at least in part on the determination that the UE did not identify the beam configuration of the network node.

6. The method of claim 1, wherein the time for the first time period is a time that the network node determines is needed for the UE to determine one or more of a time, a frequency, or the received power of the RS in order to find the uplink transmit power for the one or more uplink communications.

7. The method of claim 1, wherein the time for the first time period is a time that the network node determines is needed for the UE to perform one or more measurements on a specified number of samples for beam detection.

8. The method of claim 7, wherein at least one of:
the specified number is 5, or
the specified number of samples are consecutive samples for layer 3 filtering during a connected state of a discontinuous reception mode.

9. The method of claim 1, wherein the time for the second time period is a time that the network node determines is needed for the UE to identify the beam configuration of the UE, from among a plurality of candidate beam configurations, that corresponds to the beam configuration of the network node, and to transmit the RS.

10. The method of claim 1, wherein the time for the second time period is a is a time that the network node determines is needed for the UE to perform one or more measurements on more than a specified number of samples for beam detection.

11. The method of claim 10, wherein the specified number of samples are consecutive samples for layer 3 filtering during a connected state of a discontinuous reception mode.

12. The method of claim 1, further comprising determining that the UE identified the beam configuration, of the network node, and a reference signal, associated with the beam configuration, based at least in part on a determination that at least one of:
the message is transmitted by the network node within a certain time period since a transmission was received from a resource the UE is configured to use for beam reporting or measurement,
a measurement report for the beam configuration is received from the UE,
the beam configuration for the network node remains detectable during a switch period for the beam configuration of the network node,
a synchronization signal block associated with the beam configuration remains detectable during a switch period for the beam configuration of the network node, or
a signal-to-noise ratio (SNR) of the beam configuration of network node is greater than a threshold.

13. The method of claim 12, where the reference signal is a synchronization signal block.

14. The method of claim 12, where the threshold is −3 decibels (−3 dB).

15. The method of claim 12, where the certain time period is 1280 ms.

16. The method of claim 12, wherein transmitting the message includes transmitting the message through a first cell and communicating with the UE includes communicating with the UE through a second cell.

17. The method of claim 16, wherein the first cell is one of a primary cell or a secondary cell, and the second cell is the other one of the primary cell or the secondary cell.

18. A method of wireless communication performed by a user equipment (UE), comprising:
receiving a message, from a network node, instructing the UE to activate or update a reference signal (RS) corresponding to an uplink communication; and
communicating with the network node, after a first time period or a second time period longer than the first time period, using a beam configuration of the UE for the RS that corresponds to a beam configuration of the network node,
wherein:
the first time period is based at least in part on a determination that the UE identified the beam configuration of the network node, or the second time period is based at least in part on a determination that the UE did not identify the beam configuration of the network node, and
at least one of the first time period or the second time period includes a time for the UE to determine a received power of the reference signal in order to find an uplink transmit power for one or more uplink communications.

19. The method of claim 18, wherein the RS is a path loss RS for one or more of a physical uplink channel, a path loss RS for an aperiodic uplink sounding RS, or a semi-persistent uplink sounding RS.

20. The method of claim 18, wherein the RS is one of a channel state information RS, a synchronization signal block, a tracking RS, a demodulation RS, a phase tracking RS, or a UE RS.

21. The method of claim 18, wherein the time period is longer if the UE had not identified and stored the beam configuration of the network node than if the UE had identified and stored the beam configuration of the network node.

22. The method of claim 21, further comprising at least one of:
determining, during the first time period, one or more of a time, a frequency, or the received power of the RS in order to find the uplink transmit power for the one or more uplink communications;
performing, during the first time period, measurements on a specified number of samples for beam detection;
determining, during the second time period, the beam configuration of the UE, from among a plurality of candidate beam configurations, that corresponds to the beam configuration of the network node; or
performing, during the second time period, measurements on more than the specified number of samples for beam detection.

23. The method of claim 22, wherein the specified number of samples are consecutive samples for layer 3 filtering during a connected state of a discontinuous reception mode.

24. The method of claim 22, wherein the more than the specified number of samples are consecutive samples for layer 3 filtering during a connected state of a discontinuous reception mode.

25. The method of claim 18, wherein the message is received through a first cell and the communicating with the network node is through a second cell.

26. The method of claim 25, wherein the first cell is one of a primary cell or a secondary cell, and the second cell is the other one of the primary cell or the secondary cell.

27. A user equipment (UE) for wireless communication, comprising:
a memory; and
one or more processors, coupled to the memory, configured to:
receive a message, from a network node, instructing the UE to activate or update a reference signal (RS) corresponding to an uplink communication; and
communicate with the network node, after a first time period or a second time period longer than the first time period, using a beam configuration of the UE for the RS that corresponds to a beam configuration of the network node,
wherein:
the first time period is based at least in part on a determination that the UE identified the beam configuration of the network node, or the second time period is based at least in part on a determination that the UE did not identify the beam configuration of the network node, and
at least one of the first time period or the second time period includes a time for the UE to determine a received power of the reference signal in order to find an uplink transmit power for one or more uplink communications.

28. The UE of claim 27, wherein the RS is a path loss RS for one or more of a physical uplink channel, a path loss RS for an aperiodic uplink sounding RS, or a semi-persistent uplink sounding RS.

29. The UE of claim 27, wherein the time period is longer if the UE had not identified and stored the beam configuration of the network node than if the UE had identified and stored the beam configuration of the network node.

30. The UE of claim 29, wherein the one or more processors are further configured to at least one of:
determine, during the first time period, one or more of a time, a frequency, or the received power of the RS in order to find the uplink transmit power for the one or more uplink communications; performing, during the first time period, measurements on a specified number of samples for beam detection;
determine, during the second time period, the beam configuration of the UE, from among a plurality of candidate beam configurations, that corresponds to the beam configuration of the network node; or
perform, during the second time period, measurements on more than the specified number of samples for beam detection.

\* \* \* \* \*